US012671995B1

(12) United States Patent
Casey et al.

(10) Patent No.: US 12,671,995 B1
(45) Date of Patent: *Jun. 30, 2026

(54) ACCESS POINT PORT SECURITY SYSTEM

(71) Applicant: Calix, Inc., San Jose, CA (US)

(72) Inventors: Martin Casey, Dallas, TX (US);
Vincent Le Chevalier, Waikoloa, HI
(US)

(73) Assignee: Calix, Inc., San Jose, CA (US)

( * ) Notice: Subject to any disclaimer, the term of this
patent is extended or adjusted under 35
U.S.C. 154(b) by 215 days.

This patent is subject to a terminal dis-
claimer.

(21) Appl. No.: 18/513,301

(22) Filed: Nov. 17, 2023

Related U.S. Application Data

(63) Continuation-in-part of application No. 18/479,088,
filed on Oct. 1, 2023.

(51) Int. Cl.
| | |
|---|---|
| *H04W 12/08* | (2021.01) |
| *H04W 12/121* | (2021.01) |
| *G06F 21/86* | (2013.01) |
| *G06F 21/88* | (2013.01) |
| *H01R 13/639* | (2006.01) |
| *H04L 9/40* | (2022.01) |

(52) U.S. Cl.
CPC ......... *H04W 12/121* (2021.01); *H04W 12/08*
(2013.01); *G06F 21/86* (2013.01); *G06F 21/88*
(2013.01); *H01R 13/6397* (2013.01); *H04L*
*63/00* (2013.01); *H04L 63/1416* (2013.01)

(58) Field of Classification Search
CPC ..... G06F 21/86; G06F 21/88; H01R 13/6397;
H04W 12/08; H04W 12/121; H04L
63/1416; H04L 63/00
See application file for complete search history.

(56) References Cited

U.S. PATENT DOCUMENTS

| | | | | |
|---|---|---|---|---|
| 9,147,974 | B2 * | 9/2015 | Wang | G02B 6/3893 |
| 10,127,409 | B1 * | 11/2018 | Wade | G06F 21/75 |
| 10,461,459 | B1 * | 10/2019 | Carey | H01R 13/6395 |

(Continued)

OTHER PUBLICATIONS

"Anti-Tamper Radio: System-Level Tamper Detection for Comput-
ing Systems"—Staat et al., Max Planck Institute for Security and
Privacy, Dec. 16, 2021 https://casa.rub.de/fileadmin/img/Publikationen_
PDFs/2022_Anti-Tamper_Radio_System-Level_Tamper_Detection_
for_Computing_Systems (Year: 2021).*

(Continued)

*Primary Examiner* — Randy A Scott
(74) *Attorney, Agent, or Firm* — Staniford Tomita LLP

(57) ABSTRACT

Access point network equipment has communication ports
that allow communications with other network components
and a cloud based AP device management system having an
Auto Configuration Service (ACS). Communications cables
coupled to ports can be easily removed and replaced with
unauthorized devices that have access to the network cre-
ating a security breach. When an authorized cable or plug is
removed from a port, a link down event can be detected by
tamper detection software running on the access point
network equipment and the link down event information can
be transmitted to the cloud/Map service. When a link down
events is detected, the cloud/ACS transmits instructions to
the access point network equipment to perform various
possible security actions to protect the network.

17 Claims, 23 Drawing Sheets

(56) References Cited

U.S. PATENT DOCUMENTS

2019/0207953  A1*  7/2019  Klawe ..................... G06F 21/57
2023/0029114  A1*  1/2023  Chapman, Jr. .......... G06F 21/82
2023/0130043  A1*  4/2023  Canter  ................... G06F 21/86
                                                          726/34

OTHER PUBLICATIONS

"AN1247: Anti-Tamper Protection Configuration and Use"—
Silicon Laboratories, Inc., Dec. 1, 2021 https://www.silabs.com/
documents/public/application-notes/an1247-efr32-secure-vault-tamper.
pdf (Year: 2021).*

* cited by examiner

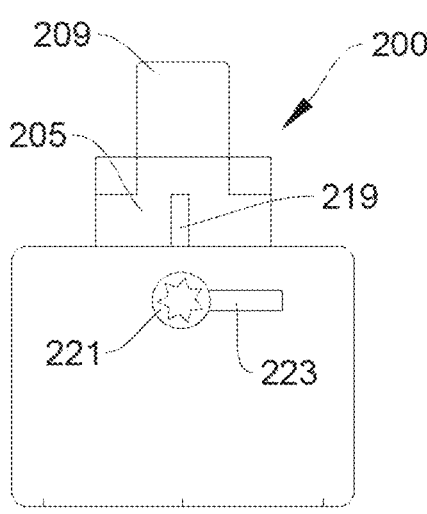
FIG. 9
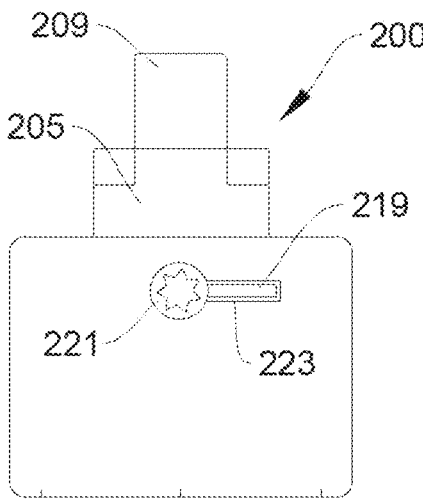
FIG. 10
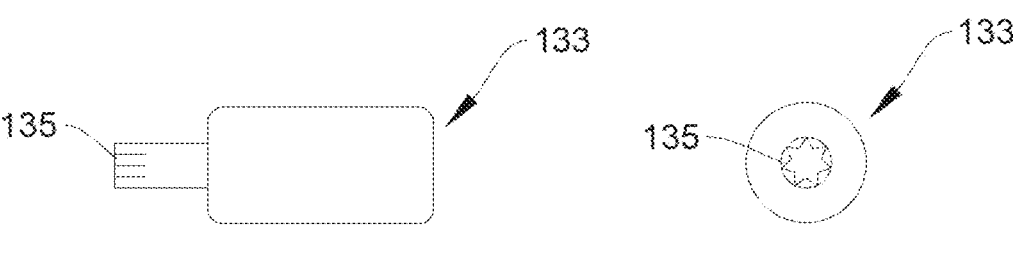
FIG. 11          FIG. 12

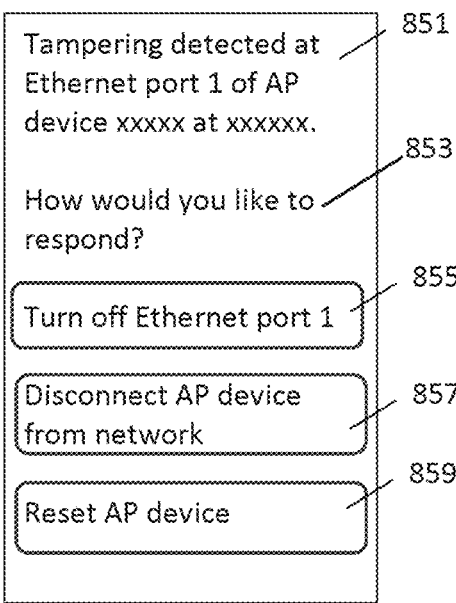

FIG. 36

Tampering detected at Ethernet port 1 of AP device xxxxx at xxxxxx. —851

How would you like to respond? —853

Turn off Ethernet port 1 —855

Disconnect AP device from network —857

Reset AP device —859

Tampering detected at Ethernet port 1 of AP device xxxxx at xxxxxx. —851

Ethernet port 1 was turned off, AP device was disconnected from the network, and/or AP device was reset. —863

Turn Ethernet port 1 on —865

Reconnect AP device —867

FIG. 37

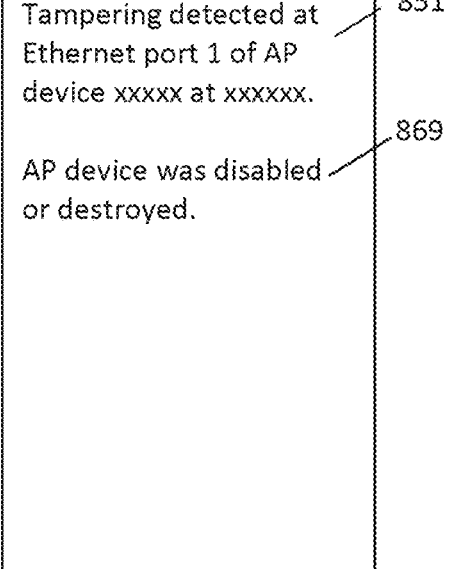

FIG. 38

Tampering detected at Ethernet port 1 of AP device xxxxx at xxxxxx. —851

AP device was disabled or destroyed. —869

ACCESS POINT PORT SECURITY SYSTEM

CROSS REFERENCE TO RELATED APPLICATIONS

This application is a continuation in part (CIP) of U.S. patent application Ser. No. 18/479,088, titled "Access Point Port Security System" filed Oct. 1, 2023 which is hereby incorporated by reference in its entirety.

BACKGROUND

Communication cables are used to connect various computer devices to each other and an internet service provider to send and receive electronic communications. It can be very important to prevent unauthorized access to the network to avoid data breaches, viruses, and/or unauthorized access the data and programs stored on the network. The ends of the communications cable can be coupled to registered jack (RJ) connector plugs that are placed in the female jack ports in access points (AP) network system components. The RJ plugs can be easily removed from the RJ ports by moving the latch lever to unlock the locking latch which allows the RJ plug to be freely removed from the RJ port.

The AP network system components can have both open and filled connector jack ports. A problem with these ports is that it is easy for unauthorized computing devices to be connected to these ports which are potential vectors for attack by third parties that could compromise the network security and allow security breaches of the computer networks.

What is needed are security systems and locking mechanisms for AP network equipment ports that can prevent unauthorized access to AP network equipment. For example, a locking RJ plug that can fill unused RJ ports to prevent unauthorized access to the network components and a locking cover that prevents the unauthorized removal of RJ plug connectors and cables from the RJ ports in the network components. What is also needed is software that can detect tampering and respond by disabling the AP jack ports and/or AP network equipment.

BRIEF DESCRIPTION OF THE DRAWINGS

FIG. 9 is a back view of another embodiment of the locking plug in a locked configuration.

FIG. 10 is a back view of another embodiment of the locking plug in an unlocked configuration.

FIG. 11 is a side view of an embodiment of a proprietary tool used to actuate the locking mechanism in the locking plugs.

FIG. 12 is a front view of an embodiment of a proprietary tool used to actuate the locking mechanism in the locking plugs.

FIGS. 36-38 illustrate embodiments of UIs for a system administrator computing device.

DETAILED DESCRIPTION

Figure 1:
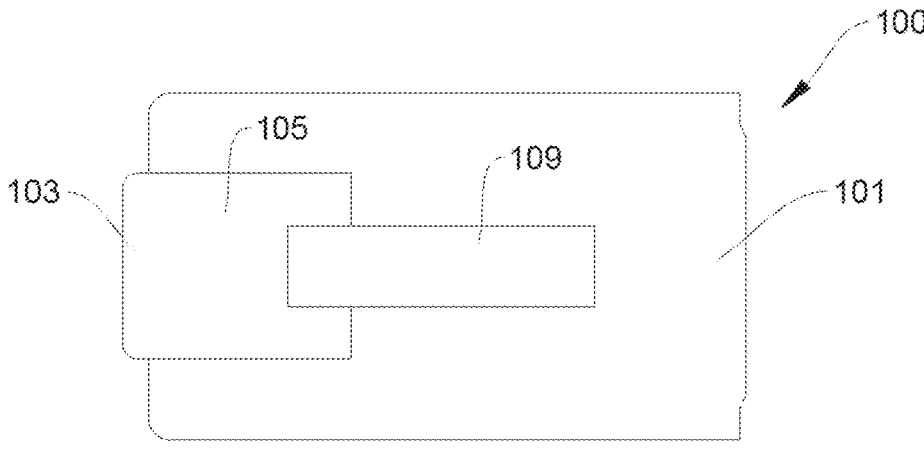
FIG. 1 is a top view of an embodiment of the locking plug.

The present invention includes systems and apparatus for preventing unauthorized connections to AP network equipment through communications ports. AP network equipment can have both unfilled ports and filled ports that are connected to communication cables. The locking devices can prevent unauthorized connections to both unused communications ports as well as used communications ports in the AP network components. The unfilled jack ports of the AP network components can each be filled with a locking RJ plug that is not coupled to an Ethernet communications cable. The locking RJ plug can be installed using a proprietary tool so that once installed and locked, the locked RJ plug cannot be removed by unauthorized users without damaging the connected AP network equipment or being detected by security software running on the AP network equipment. By locking an RJ connector plug into each of the unused AP jack ports, unauthorized Ethernet cables cannot be connected to the open and unused AP jack ports.

In an embodiment, a locking RJ connector plug can be inserted into an open AP jack port and then locked to prevent removal. The locking RJ connector plug can include a plug body that can fill the AP jack, a locking latch, a latch lever coupled to the locking latch, and a hinge coupled to the upper front edge of the plug body and a front portion of the locking latch. When the connector plug is inserted into an AP jack port, the locking latch is deflected towards the plug body. When the connector plug is fully inserted into an AP jack port, the locking latch springs away from the plug body and engages a corresponding locking inner surface of the AP jack port that holds the plug in the AP jack port.

The locking RJ connector plug can also include a locking mechanism that can prevent the locking latch from being moved so that the plug cannot be removed from the AP jack port. In an embodiment, the locking mechanism can include an elongated axial member that is mounted in an elongated bore that extends axially along the length of a center portion of the plug body. A radial member is coupled to a side surface of the axial member within the bore. The locking mechanism can have a locked position where the radial member is in a position to prevent the locking latch from disengaging its corresponding locking slot in the AP jack. The locking mechanism also has an unlocked position where the radial member does not prevent the locking latch from disengaging its corresponding locking slot in the AP jack. The locking mechanism can be rotated within the plug body between locked and unlocked positions. The locking mechanism can have a proprietary driving head that requires a proprietary tool to rotate the locking mechanism between the locked and unlocked positions.

Locking RJ connector plug covers can be placed around the authorized RJ connector plugs to prevent the removal of the authorized Ethernet cables from the filled AP jacks of the network components. In some embodiments, the locking RJ connector plug cover can include two cover pieces coupled to each other by a hinge. One of the cover pieces has a locking protrusion adapted to engage a recess in a bottom surface of the RJ cable connector plug at an end of the communications cable. The locking RJ connector cover can be closed to cover the cable RJ connector by rotating the cover pieces around the hinge. The two pieces can be fastened to each other by a fastener. In other embodiments, the plug cover can include multiple separate pieces that can be secured to each other with fasteners. In some embodiments, a component of the plug cover can be rigidly coupled to the RJ connector port portion of the AP network equipment. In some embodiments, the plug cover fasteners can be threaded bolts that have proprietary driving heads. The fasteners can require a proprietary tool to rotate the fasteners to prevent unauthorized disassembly of the RJ connector plug covers. In other embodiments, other types of locking fasteners can be used to secure the cover pieces to each other.

In some embodiments, the locking plug can include a modified RJ plug structure that can provide a physical deterrent that can prevent third parties from gaining easy access to empty ports on the AP network equipment. The locking cover can also provide a physical deterrent that can prevent third parties from removing authorized RJ cable connectors from the jack ports on the AP network equipment. The locking plugs and the locking covers can be parts of an overall security solution.

In addition to the physical deterrence provided by the locking plug and the locking connector plug cover, software running on the AP network equipment can be used to provide a tampering security service to provide a higher level of tampering security. The software can be configured to have various different response reactions to detected tampering at the RJ jack ports of the AP network equipment. In some embodiments, the tamper software can control the AP network equipment to transmit a notification of tampering to a computing device of a system administrator or a tampering security service.

A network administrator or a tampering security service can respond by instructing the software to turn off the port or the entire AP network equipment. If the detected tampering is investigated and resolved, the network administrator or a tampering security service can instruct the software to turn on the port or turn on the entire AP network equipment. In some embodiments, the tamper software can control the AP network equipment to turn off the port or the entire AP network equipment and transmit a notification of tampering to a computing device of a system administrator or a tampering security service.

In some embodiments, a network system administrator computing device can communicate and control the AP network equipment via a mobile application (App) and Cloud Service Commerce (CSC), or other control systems. If the detected tampering is investigated and resolved, the network administrator or a tampering security service can instruct the software to turn on the port or turn on the entire AP network equipment.

In some embodiments, where the network requires high security, the tamper software can transmit a notification of tampering to a computing device of a system administrator or a tampering security service and then control the power supply of the AP network equipment to destroy the AP network equipment. The power supply can be controlled to increase the power transmitted through a fuse or a trace in the electrical system of the AP network equipment. The increased power can destroy the fuse or trace so that the AP network equipment is disabled. The AP network equipment can then be investigated and possibly repaired to replace the fuse or trace.

The security system can include both software and hardware components that work together to prevent unauthorized access. AP network equipment has communication ports which can be Ethernet, phone, universal serial bus (USB), and other types of ports that are used to physically connect communication cables to other network equipment components. The AP network equipment can have both filled communication ports that are coupled to cable plugs and communications cable and unfilled communication ports that are normally available for future cable connections. Tampering can include removal of the plugs in the filled ports and/or placing unauthorized cable plugs into the ports. To prevent tampering with authorized cables, the system can include locking covers placed over the authorized cable plugs so that the authorized cable cannot be removed from the AP network equipment. To prevent tampering with open ports in the AP network equipment, locking plugs can be placed into all unfilled ports and locked to prevent unauthorized cables from being connected. The locking plugs can also be covered with the locking covers for further security. The security system can also include software that can detect tampering and respond with security actions such as disabling individual ports or disabling the AP network equipment to prevent unauthorized access to the connected network.

The locking plug can prevent unauthorized connections to unused communications ports. The locking RJ plug can be a small port plug structure that is not coupled to a communications cable. The locking RJ plug can be installed into the port and then locked using a proprietary tool so that the locked RJ plug cannot be removed by unauthorized users without damaging the port and/or the connected AP network equipment. By locking the RJ connector plugs into each of the unused AP jack ports, unauthorized Ethernet cables cannot be connected to the open and unused AP jack ports. If an unauthorized user is successful in removing the locking RJ plug, this unauthorized activity can be detected by security software running on the AP network equipment.

Figure 2:
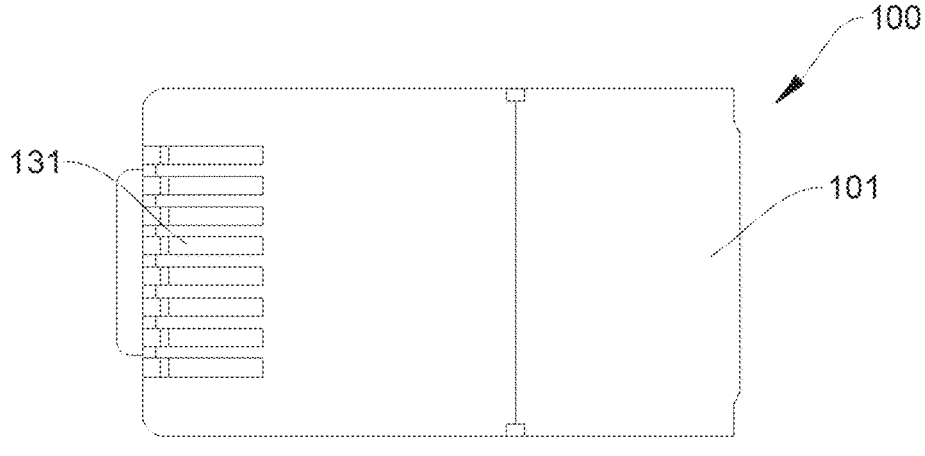
FIG. 2 is bottom view of an embodiment of the locking plug.
Figures 3, 4:
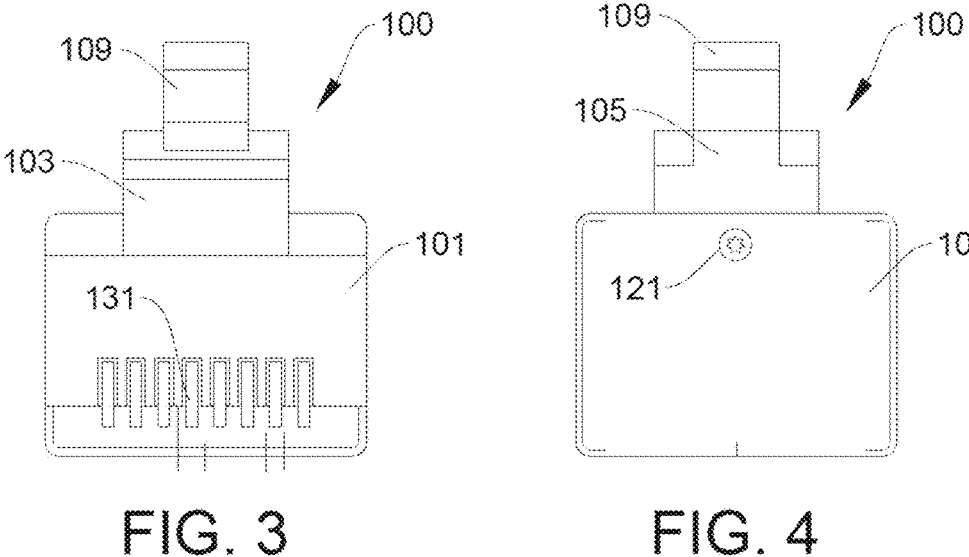
FIG. 3 is a front view of an embodiment of the locking plug.
FIG. 4 is a back view of an embodiment of the locking plug.

FIG. 1 is a top view of an embodiment of a locking connector plug 100, FIG. 2 is bottom view of an embodiment of the locking connector plug 100, FIG. 3 is a front view of an embodiment of the locking connector plug 100, and FIG. 4 is a back view of an embodiment of the locking connector plug 100. As shown in FIGS. 1-4, in some embodiments, the locking connector plug 100 can have a connector plug body 101 that has a basic rectangular box shape and is adapted to fit within a connector jack of a AP network component device. Examples of AP network component device include: routers, computing devices, peripheral components, network switches, etc.

A hinge 103 can be coupled to a front top portion of the connector plug body 101 and a locking latch 105 can be coupled to the hinge 103. The locking latch 105 can extend from the front top portion towards a rear portion of the connector plug body 101, and the locking latch 105 and an upper surface 107 of the connector plug body 101 can form an acute angle. A latch lever 109 can be coupled to the locking latch 105 for rotating the locking latch 105 about the hinge 103. When the locking connector plug 100 is inserted into a corresponding jack port of the AP network device, the locking latch 105 is fully inserted and engages an inner facing edge of the port. This locking latch engagement holds the locking connector plug 100 in place and prevents the locking connector plug 100 from being removed from the port. The locking latch lever 109 moved towards the connector plug body 101 to release the locking latch 105 from the inner facing edge of the port to the locking connector plug 100 can be removed from the port. In some embodiments, the hinge 103 and the locking latch 105 can be formed in one piece with the connector plug body 101 and can be made of suitable materials, such as plastics so that the hinge 103 can have elasticity. When the locking member 115 of the locking connector plug 100 is in its unlocked position, the locking connector plug 100 can be plugged into an unused socket jack port and locked in place to prevent unauthorized access and/or use.

Figure 5:
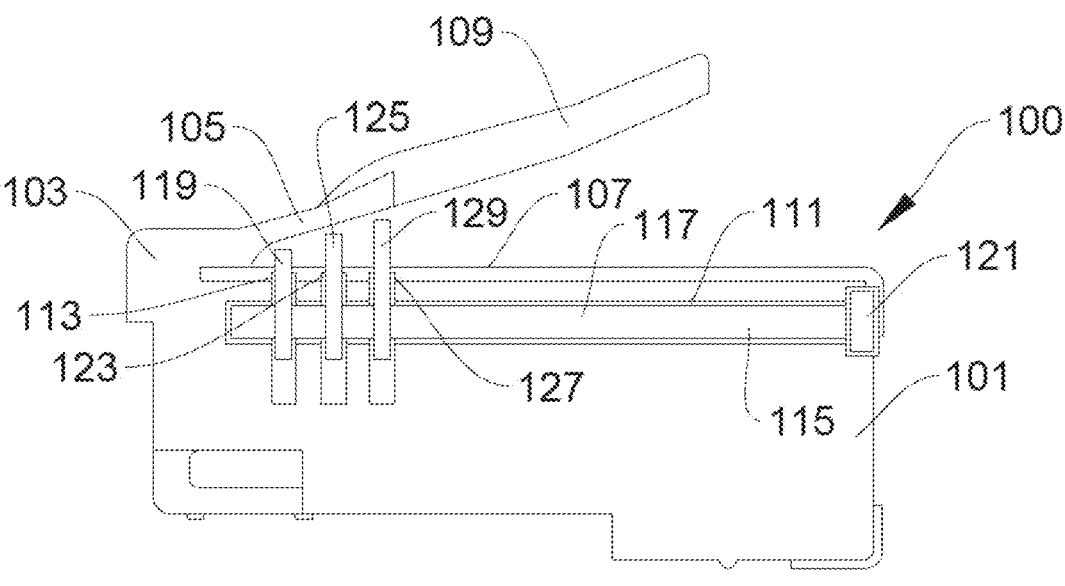
FIG. 5 is a side view of an embodiment of the locking plug in a locked configuration.
Figure 6:
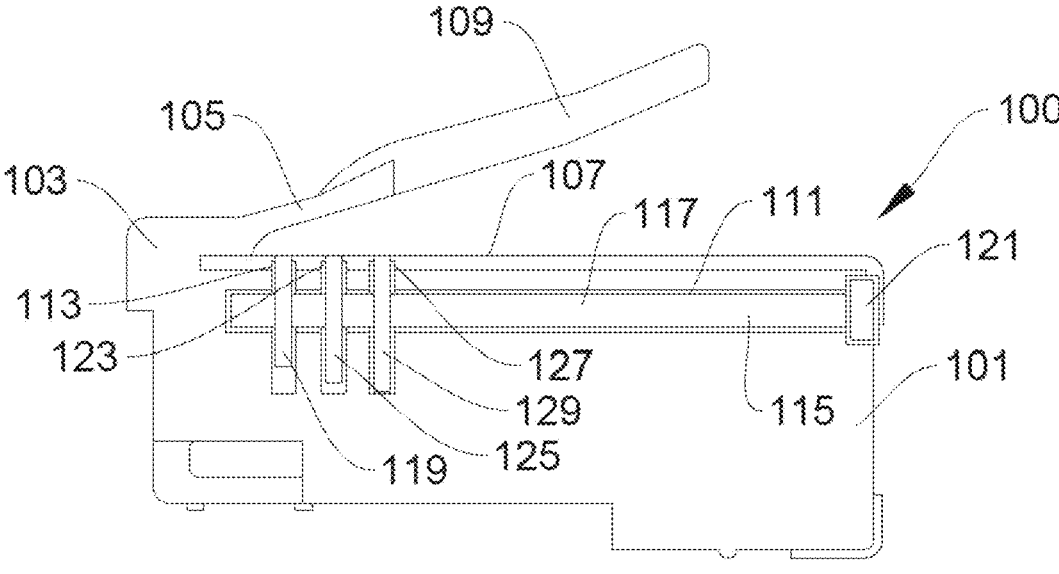
FIG. 6 is a side view of an embodiment of the locking plug in an unlocked configuration.

FIG. 5 is a cross-section side view of an embodiment of the locking connector plug in a locked configuration and FIG. 6 is a cross-section side view of an embodiment of the locking connector plug in an unlocked configuration. A bore 111 in the connector plug body 101 can extend axially from the rear portion of the connector plug body 101 to a front portion of the connector plug body 101. A first slot 113 in the connector plug body 101 can extend from the bore 111 through the upper surface 107 to areas under the locking latch 105. The locking connector plug 100 can have a locking member 115 that includes an axial member 117 and a first radial member 119 coupled to a side of the axial member 117. The axial member 117 can rotate within bore 111 and the first radial member 119 can rotate within the first slot 113.

As shown in FIGS. 5 and 6, the axial member 117 and the driving feature 121 are within the bore 111. In FIG. 5, the locking member 115 is in a locked position where the first radial member 119 extends through the first slot 113 to a position above the upper surface 117 of the connector plug body 101 to prevent the locking latch 105 from moving towards the upper surface 117 of the connector plug body 101. In FIG. 6, the locking member 115 is in an unlocked position where the first radial member 119 is moved to a lower position that does not prevent the locking latch 105 from moving towards the upper surface 117 of the connector plug body 101. The locking member 115 can have a non-standard and/or proprietary driving feature 121 on a rear portion of the axial member 117 as shown in FIG. 4 that can prevent the actuation of the locking member 115

In some embodiments, as also shown in FIGS. 5 and 6, the locking connector plug 100 can have a second slot 123 and a third slot 127 that extends from the bore 111 through the upper surface 107 of the connector plug body 101 to other areas under the locking latch 105. A second radial member 125 and a third radial member 129 can be coupled to a side of the locking axial member 117. In the locked position as shown in FIG. 5, the second radial member 125 extends through the second slot 123 and the third radial member 129 extends through the third slot 127 to adjacent positions above the upper surface 117 of the connector plug body 101. The upper surfaces of the second radial member 125 and the third radial member 129 can also prevent the locking latch

105 from moving towards the upper surface 107 of the connector plug body 101. In the unlocked position as shown in FIG. 6, the second radial member 125 and the third radial member 129 are moved to lower positions that do not prevent the locking latch 105 from moving towards the upper surface 117 of the connector plug body 101. The radial members 119, 125, 129 can have various different possible shapes including circular discs, oval discs, or any other shape that allows for rotational movement within the slots 113, 123, 127 to positions under the locking latch 105.

The locking connector plug 100 can be inserted into an open jack port of AP network equipment. During the plug insertion, the latch lever 109 and the locking latch 105 is moved down towards to the upper surface 107 of the connector plug body 101 about the hinge 103. When the locking connector plug 100 reaches its fully inserted position in the jack port, the locking latch 105 can spring upward away from the upper surface 107 of the connector plug body 101 to engage an inner edge surface of the jack port. To lock the locking connector plug 100 in place, the locking member 115 can be rotated to its locked position with the proprietary wrench 133 having a driver end that fits the driving feature 121 on the axial member 117. The rotation can cause the radial members 119, 125, 129 pass through their corresponding slots 119, 125, 129 to positions above the upper surface 107 of the connector plug body 101 and under the locking latch 105. Since the radial members 119, 125, 129 are under the locking latch 105, even when the latch lever 109 is actuated, the locking latch 105 cannot be moved towards the upper surface 107 of the connector plug body 101. Thus, the locking latch 105 remains in its locking position and the locking connector plug 100 cannot be removed from the port.

When an authorized user wants to remove the locking connector plug 100, the locking member 115 can be rotated to its unlocked position with the proprietary wrench 131. This causes the radial members 119, 125, 129 to return to positions below the upper surface 107 of the locking connector plug 100 where the radial members 119, 125, 129 do not block the movements of the locking latch 105. The latch lever 109 can be actuated to move the locking latch 105 towards the upper surface 107 of the connector plug body 101 and the locking connector plug 100 can be removed from the jack port of the AP network equipment.

In some embodiments, as shown in FIG. 4, the driving feature 121 can be configured to be a recess with a non-standard driving feature that can require a special non-standard wrench to rotate the axial member 117. Common standard driving features include: flat head, Phillips head, and hex head driving features that are easily rotated with standard wrenches or screw drivers. Non-standard driving features can include star-shaped, asymmetric hole patterns, and other recessed or protruding features that require special wrenches to rotate to locking mechanism. FIG. 11 illustrates a side view and FIG. 12 illustrates a front view of a tool having a star-shaped driver head that can engage the driving feature on the locking mechanism and be used to rotate the locking mechanism between locked and unlocked positions. In some embodiments, the tool can be an elongated wrench 133 having a driving end 135 that corresponds to the driving feature 121. In some embodiments, the driving end 135 also has a star-shape that fits the recess with the star-shaped contour of the driving feature 121 on the rear portion of the axial member 117 as shown in FIG. 4. The elongated wrench 133 is used to rotate the locking member 115 between the locked position and the unlocked position.

Figure 7:
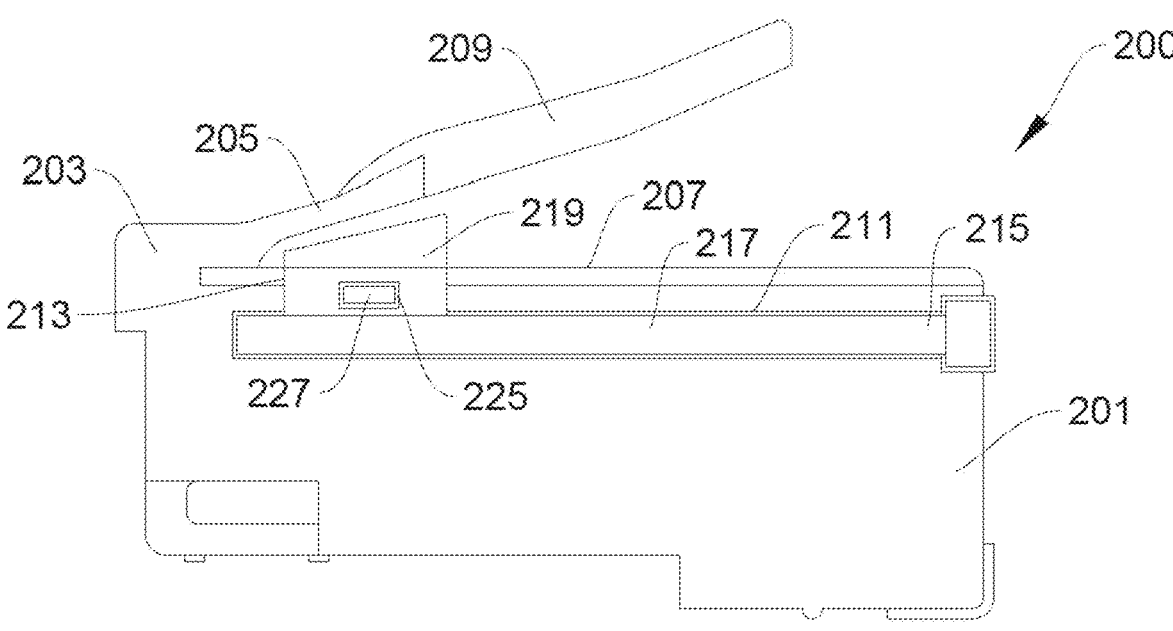
FIG. 7 is a side view of another embodiment of the locking plug in a locked configuration.
Figure 8:
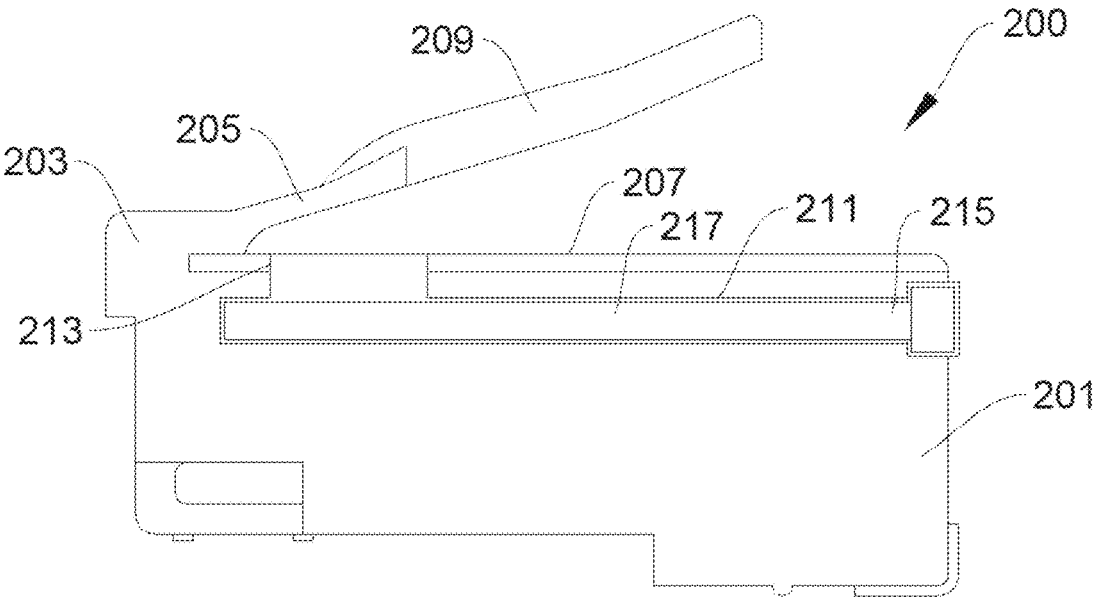
FIG. 8 is a side view of another embodiment of the locking plug in an unlocked configuration.

FIGS. 7-10 show another embodiment of a locking connector plug 200 that is similar to the locking connector plug 100 illustrated in FIGS. 1-6. FIG. 7 is a cross section side view of the embodiment of the locking connector plug in a locked configuration and FIG. 8 is a cross section side view of the locking connector plug in an unlocked configuration. FIG. 9 is a back view of the locking connector plug in a locked configuration and FIG. 10 is a back view of another embodiment of the locking connector plug in an unlocked configuration. The locking connector plug 200 can have a connector plug body 201, which is adapted to fit within a connector socket of a device such as a router or a network switch, etc. A hinge 203 can be coupled to a front top portion of the connector plug body 201. A locking latch 205 can be coupled to the hinge 203. The locking latch 205 can extend from the front top portion towards a rear portion of the connector plug body 201, and the locking latch 205 and an upper surface 207 of the connector plug body 201 can form an acute angle as shown in FIGS. 7 and 8. A latch lever 209 can be coupled to the locking latch 205 for rotating the locking latch 205 about the hinge 203.

As shown in FIGS. 7 and 8, a bore 211 in the connector plug body 201 can extend axially from the rear portion of the connector plug body 201 to a middle portion of the connector plug body 201. A hole 213 can extend from the bore 211 through the upper surface 207 of the connector plug body 201 under the locking latch 205. The locking connector plug 200 can have a locking member 215. The locking member 215 can have a key member 219 coupled to a side of the axial member 217. As shown in FIGS. 9 and 10, a driving feature 221 can be provided on a rear portion of the axial member 217. In some embodiments, the driving feature 221 can be configured to be star-shaped. A tool such as a wrench with a shape fitting to the driving feature 221 can rotate the locking member 215. As shown in FIGS. 7 and 8, the axial member 217 and the driving feature 221 are within the bore 211.

FIGS. 7 and 9 show an embodiment of the connector plug body 201 in a locked position where the key member 219 extends through the hole 213 to a position above the upper surface 207 of the connector plug body 201 to prevent the locking latch 205 from moving towards the upper surface 207 of the connector plug body 201. FIGS. 8 and 10 show an embodiment of the connector plug body 201 in an unlocked position where the key member 219 is rotated to a lower position and the key member 219 does not prevent the locking latch 205 from moving towards the upper surface 207 of the connector plug body 201. In some embodiments, as shown in FIG. 7, an upper surface of the key member 219 can be similar or identical to the angle formed by the locking latch 205 and the upper surface 207 of the connector plug body 201.

The locking connector plug 200 can have a key slot 223 that allows the locking member 215 to be easily inserted into the connector plug body 201. The key slot 223 can be adjacent to and extend along a length of the bore 211. As shown in FIG. 10, the thickness of the key member 219 is less than the width of the key slot so that the key member 219 can pass through the key slot 223.

In some embodiments, as shown in FIG. 7, the locking connector plug 200 can have a tab 225 that can be a recess or hole in a side surface of the locking member 215. The tab 225 can be provided at the key member 219 so that the locking member 215 can be turned and the tab can engage a feature such as a protrusion 227 that can hold the key member 219 in the locking connector plug 200 and prevent the locking member 215 from sliding out of the bore 211.

In some embodiments, the hinge 203 and the locking latch 205 can be formed in one piece with the connector plug body 201. They can be made of suitable materials, such as plastics, making the hinge 203 have some elasticity. When inserting the locking connector plug 200 into the socket of the router, the latch lever 209 is pushed and the locking latch 205 is moved towards to the upper surface 207 of the connector plug body 201 about the hinge 203. When the locking connector plug 200 reaches its position in the socket, the push force is released and the locking latch 205 can return to its original position due to the elasticity of the hinge 203. Similarly, the latch lever 209 can be narrower than the locking latch 205 from the top view as illustrated in FIG. 1 or the back view of FIGS. 9 and 10, and the locking latch 205 can be kept in the socket. Then, the locking member 215 can be rotated to its locked position with the wrench 133 fitting the driving feature 221, where the key member 219 passes through the hole 213 and exceeds beyond the upper surface 207 of the connector plug body 201 under the locking latch 205. Since the key member 219 is under the locking latch 205, even if the latch lever 209 is pushed, the locking latch 205 cannot be moved towards the upper surface 207 of the connector plug body 201. Thus, the locking latch 205 remains in its locking position and the locking connector plug 200 cannot be plugged out. When the locking connector plug 200 is desired to be plugged out, the locking member 215 can be rotated to its unlocked position with the wrench 131, where the key member 219 returns to the position where it does not block the locking latch 205. When the latch lever 209 is pushed, the locking latch 205 can be moved towards the upper surface 207 of the connector plug body 201 where the locking latch 205 is not in its locking position and the locking connector plug 200 can be plugged out.

As discussed above, in some embodiments the locking plugs can require a proprietary tool to move the locking mechanism into and out of the locked position. The proprietary tool can have special non-standard driving features. As shown in FIGS. 4, 9, and 10, the driving features 121, 221 can be a recess with a star shaped contour cross sectional shape. FIG. 11 illustrates a side view and FIG. 12 illustrates a front view of a proprietary tool 133 having a star shaped driver head 135 that can engage the driving features on the locking mechanisms. The proprietary tool 133 can be used to rotate the locking mechanism between locked and unlocked positions. In some embodiments, the proprietary tool 133 can be an elongated wrench 133 having a driving end 135 that corresponds to the driving feature 221. In some embodiments, the driving end 135 also has a star shape that fits the recess with the star shaped contour of the driving features, 121, 221 on the rear portion of the axial member 217 as shown in FIGS. 4, 9 and 10. In other embodiments, the proprietary tool 133 and the driving features, 121, 221 can have any other geometric shape that allows the actuation of the locking mechanisms.

Figure 19:
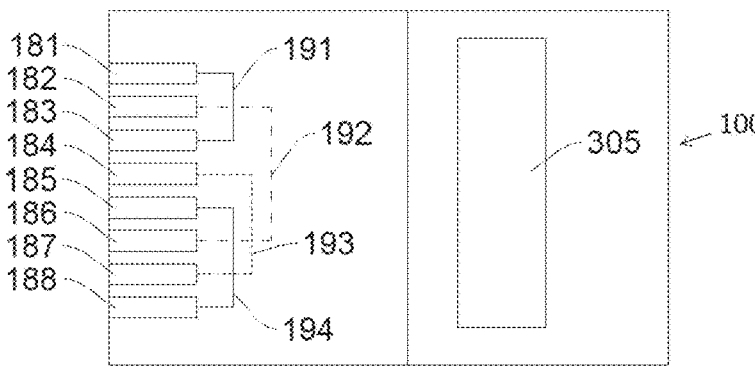
FIG. 19 is a bottom view of the locking connector plug showing an example of how the conductive connectors are coupled to each other.

In some embodiments, the locking connector plugs 100 including those described above, can have a plurality of conductive connectors 131 at a bottom front portion of the connector plug body 101. Two or more of the plurality of conductive connectors 131 are electrically coupled to each other to form a closed circuit. FIG. 19 illustrates an example of how the conductive connectors 181-188 are coupled to each other. In this example, there are 8 conductive connectors 181-188. As shown in FIG. 19, in some embodiments, a first conductive connector 181 can be coupled to the third conductive connector 183. In some embodiments, the second conductive connector 182 can be coupled to the sixth conductive connector 186. In some embodiments, the fourth conductive connector 184 can be coupled to the seventh conductive connector 187, and in some embodiments, the fifth conductive connector 185 can be coupled to the eighth conductive connector 188. When the locking connector plug 100 is connected to an AP network device, the locking connector plug 100 can be detected because of the closed circuit connected pairs of conductive connectors 181-188.

Figure 13:
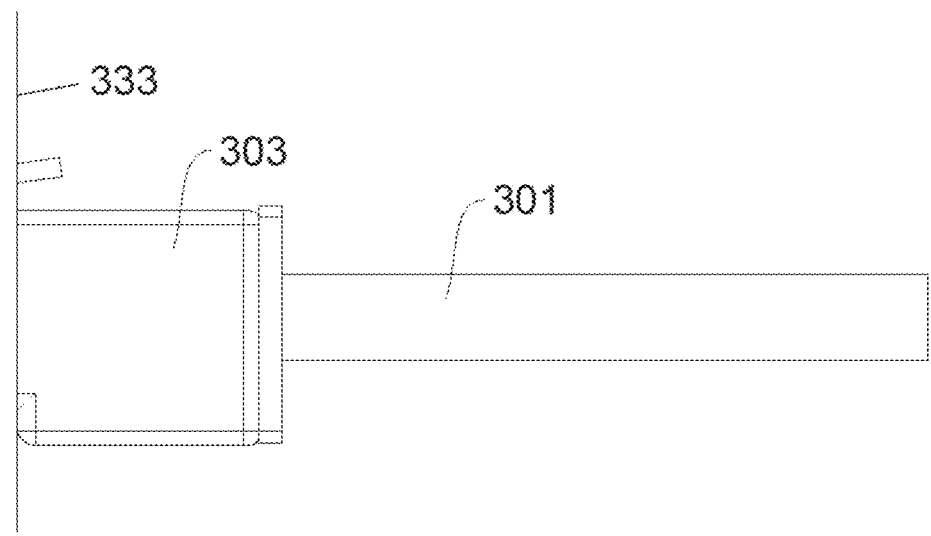
FIG. 13 illustrates a side view of an embodiment of a communication cable coupled to an RJ connector plug in an AP network equipment port.
Figure 14:
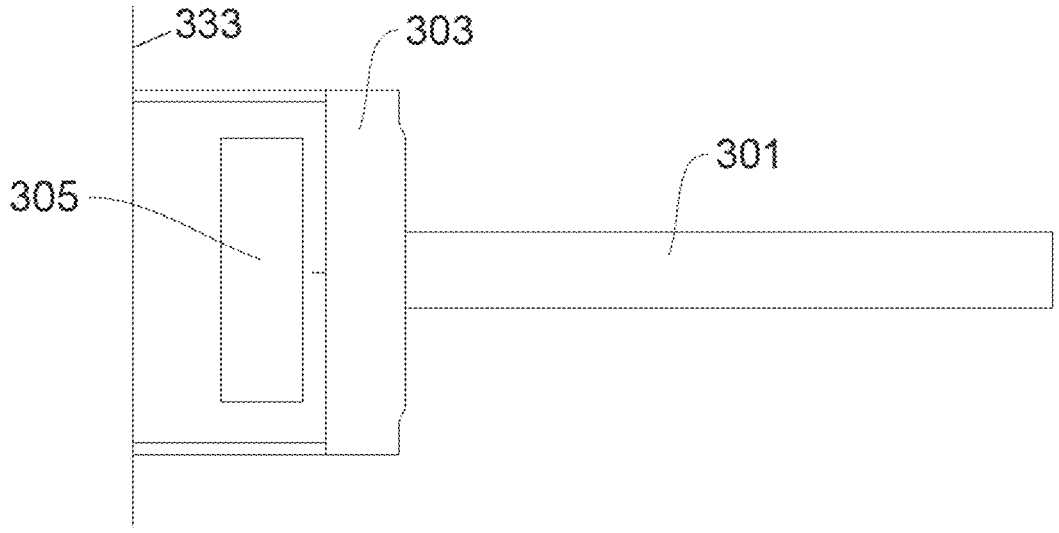
FIG. 14 illustrates a bottom view of an embodiment of a communication cable coupled to an RJ connector plug in an AP network equipment port.

FIG. 13 illustrates a side view and FIG. 14 illustrates a bottom view of a connector plug 303 and a connected cable 301 extending from a port of an AP network equipment 333. The upper and lower surfaces of the connector plug 303 can be parallel and planar and can extend at a 90 degree angle from a plane of the ports of an AP network equipment 333. The bottom of the connector plug 303 can have a recess 305 that can be used to secure a cover to the connector plug 303.

Figure 15:
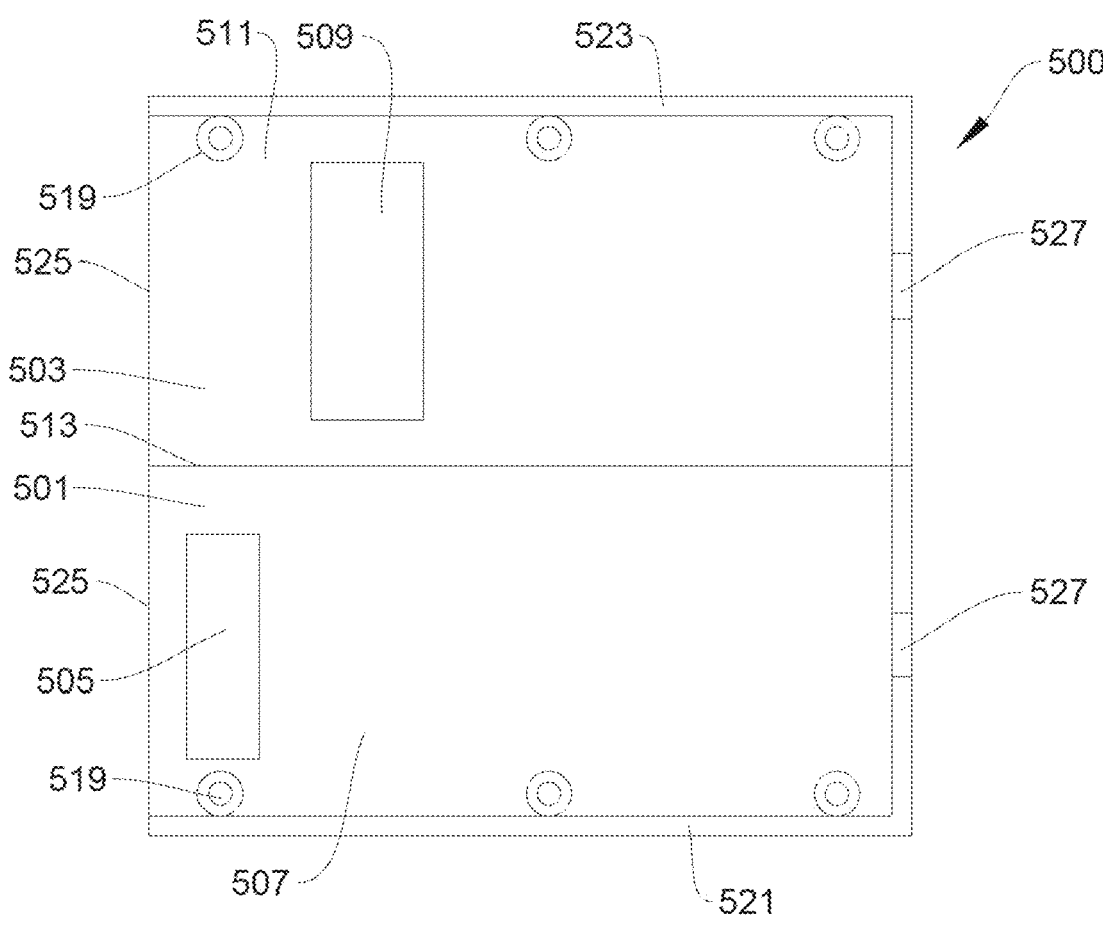
FIG. 15 is a top view of an embodiment of the locking cover in an opened position.
Figure 16:
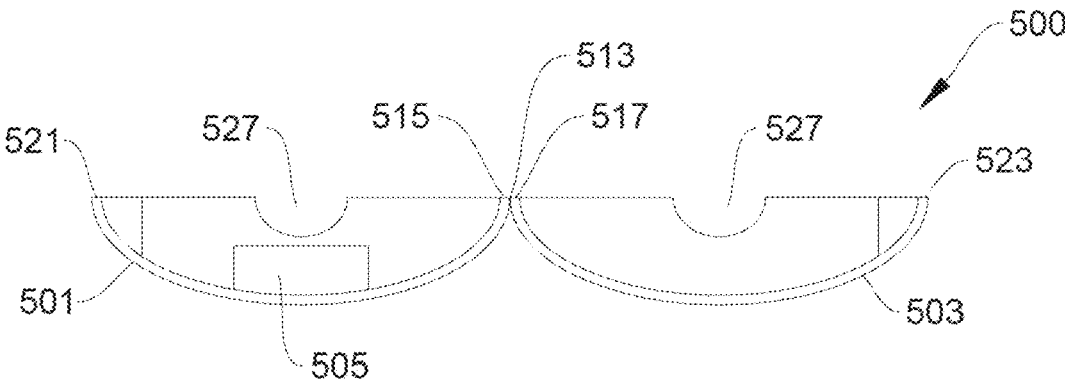
FIG. 16 is a front view of an embodiment of the locking cover in an opened position.

FIGS. 15 and 16 show an embodiment of the locking cover 500 can be used for covering and surrounding the cable connector plug 303 so that the plug 303 cannot be removed from the AP jack. The locking cover 500 can have a first upper cover piece 503 and a second lower cover piece 501. The lower cover piece 501 can have a locking protrusion 505 on a first concave inner surface 507 of the first cover piece 501. The locking protrusion 505 is sized to engage the recess 305 on a lower surface of the cable connector plug 303 as shown in FIG. 14. The upper cover piece 503 can have a planar surface 509 on a second concave inner surface 511 of the second cover piece 503 that can contact an upper surface of the cable connector plug 303 and hold the locking protrusion 505 in the recess 305 on a lower surface of the cable connector plug 303. The locking cover 500 can further have a connector opening 525 on a front end of the locking cover 500 adapted to surround a portion of the cable connector plug 303 and a cable opening 527 at a rear end of the locking cover 500 adapted to surround a portion of an electrical cable 301 extending from the cable connector plug 303.

In some embodiments, the locking cover 500 can also have a hinge 513 coupled to a first side 515 of the first cover piece 501 and a first side 517 of the second cover piece 503. The locking cover 500 can further have locking fasteners 519 for securing a second side 521 of the first cover piece 501 to a second side 523 of the second cover piece 503.

In some embodiments, the first cover piece 501, the second cover piece 503, the hinge 513 and the locking protrusion 505 can be made in one piece from a molded plastic material. The fastener 519 can be screws that can engage corresponding threaded holes to secure the first lower cover piece 501 to the second upper cover piece 503. In other embodiments, the first cover piece 501 and the second cover piece 503 can be physically separate high strength structures that may only be held together by fasteners 519 can couple these two cover pieces 501, 503 without a hinge.

The fasteners 519 can have drive heads that have a proprietary driving feature(s). These fasteners can require a proprietary tool to rotate the fasteners to prevent unauthorized disassembly of the RJ connector plug covers. The fasteners cannot be removed from the cover without the proprietary tool. In other embodiments, other types of proprietary locking fasteners can be used to secure the cover pieces to each other.

Figure 17:
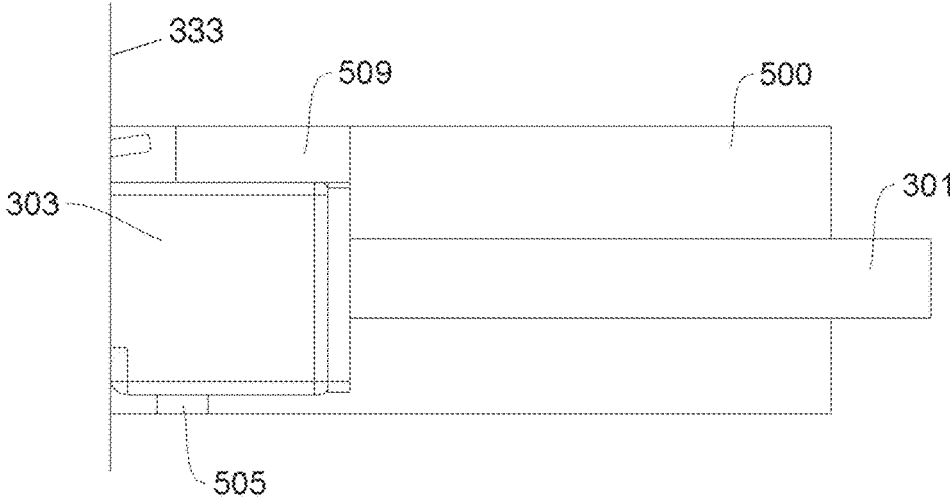
FIG. 17 is a cross section side view of an embodiment of a locking cover in a closed position coupled to an RJ connector plug in an AP network equipment port.
Figure 18:
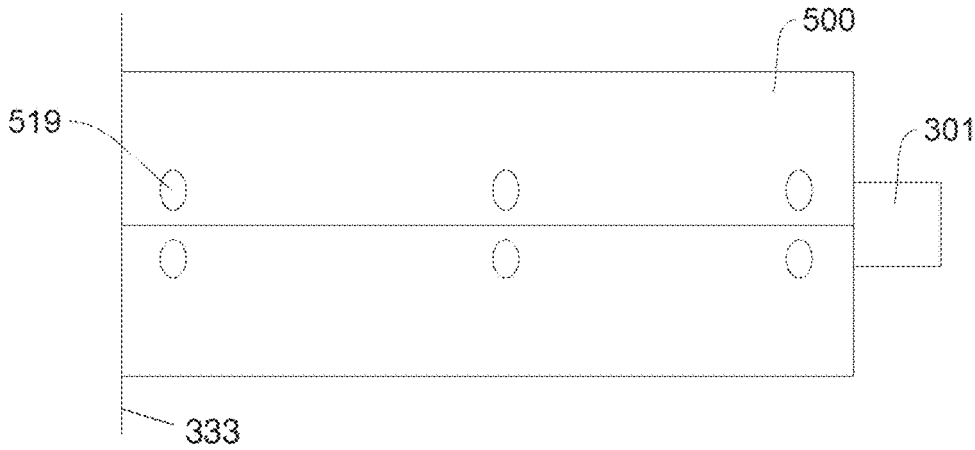
FIG. 18 is a side view of an embodiment of a locking cover in a closed position surrounding an RJ connector plug in an AP network equipment port.

When the cable connector plug 303, such as an RJ connector, is plugged into a network component AP jack (as shown in FIGS. 13 and 14), the inner surface of the lower cover piece 501 can contact the bottom side of the electrical connector 303. The locking protrusion 505 on the lower cover piece 501 can be placed in the recess 305 on the bottom side of the electrical connector 303. The upper cover piece 503 can be rotated around the hinge 513 and secured to the lower cover piece 501 so the locking cover 500 surrounds the cable connector plug 303 and an end portion of the cable 301 that extend from the AP network equipment 333 as shown in FIGS. 17 and 18. The fastener 519 can secure and lock the bottom cover piece 501 to the top cover piece 503. In some other embodiments, the connector cover can include two separate pieces and fasteners such as screws that can be used to secure both the second side 521 of the lower cover piece 501 and the second side 523 of the lower cover piece 503 to fasten the lower cover piece 501 and the upper cover piece 503.

Figure 20:
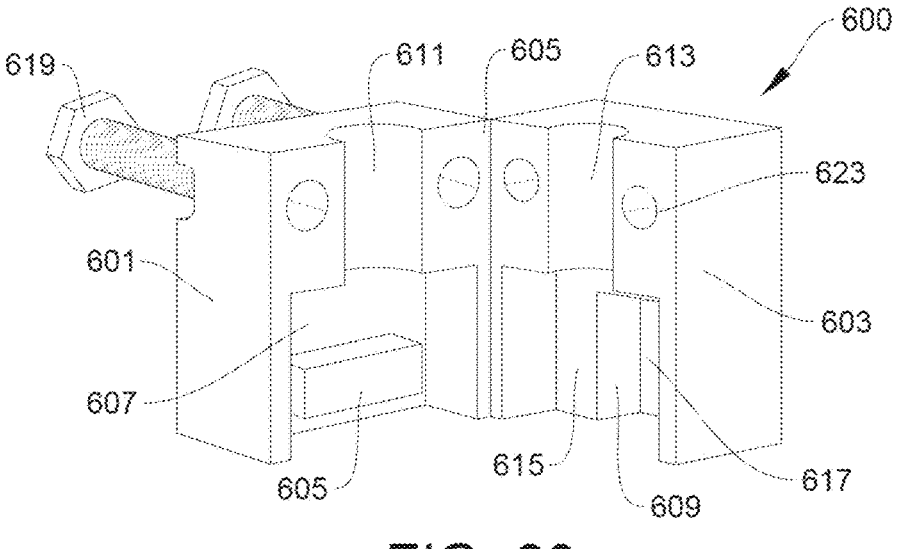
FIG. 20 is a perspective side view of an embodiment of an open cable connector locking cover.
Figure 21:
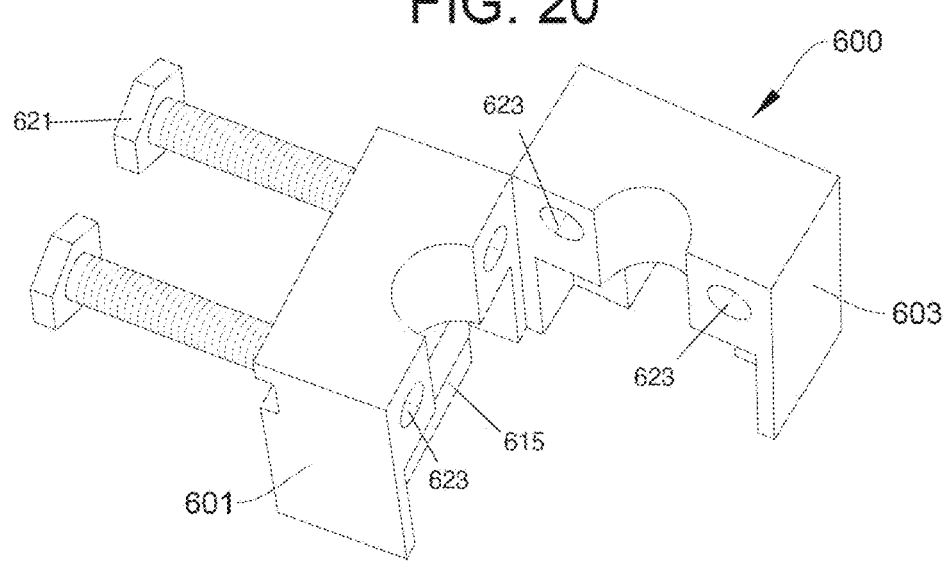
FIG. 21 is a perspective rear view of an embodiment of an open cable connector locking cover.
Figure 22:
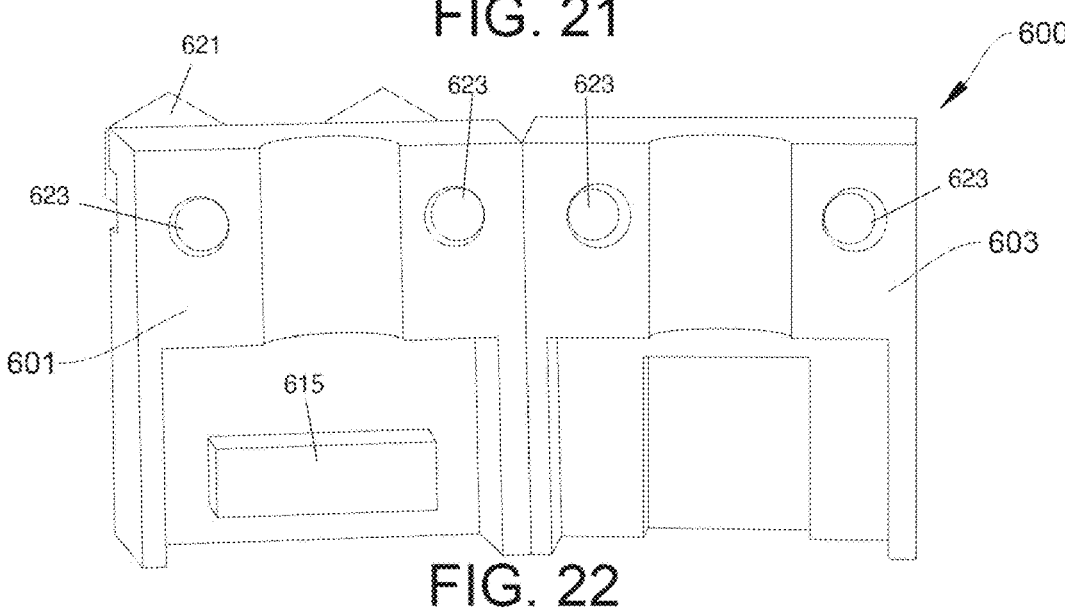
FIG. 22 is a perspective side view of the inner surfaces of an embodiment of an open cable connector locking cover.
Figure 23:
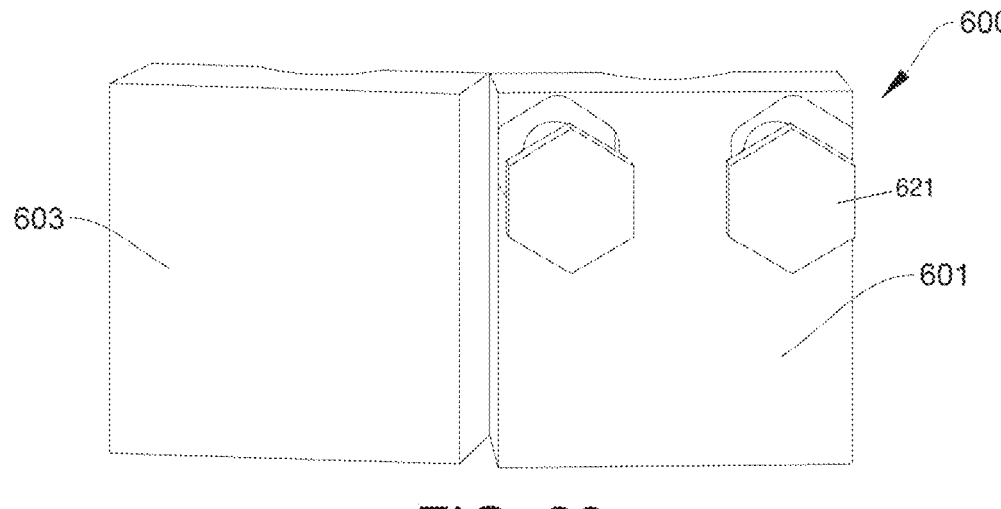
FIG. 23 is a perspective side view of the outer surfaces of an embodiment of an open cable connector locking cover.

FIGS. 20-24 show another embodiment of the locking cover 600. As shown in FIG. 20, the locking cover 600 can have a first cover piece 601 and a second cover piece 603. The two cover pieces 601, 603 can be coupled by a hinge 605 at their edges. The first cover piece 601 can have a first connector recess 607 and a first cable recess 611. The second cover piece 603 can have a second connector recess 609 and a second cable recess 613. A locking protrusion 615 can be provided in the first connector recess 607. The second connector recess 609 can have a planar surface 617 and a latch recess 619 that can provide space for the locking latch and lever when the locking cover is secured to an authorized cable connector.

In some embodiments, bolts 619 can be placed in holes 623 in one of the cover pieces 601 and screwed into corresponding thread holes 623 that can extend through the other cover piece 603 are provided. In this embodiment, there can be two bolts 619 can be driven into the corresponding two tread holes 623 to assemble and secure the two cover pieces 601, 603 around a cable connector.

Figure 24:
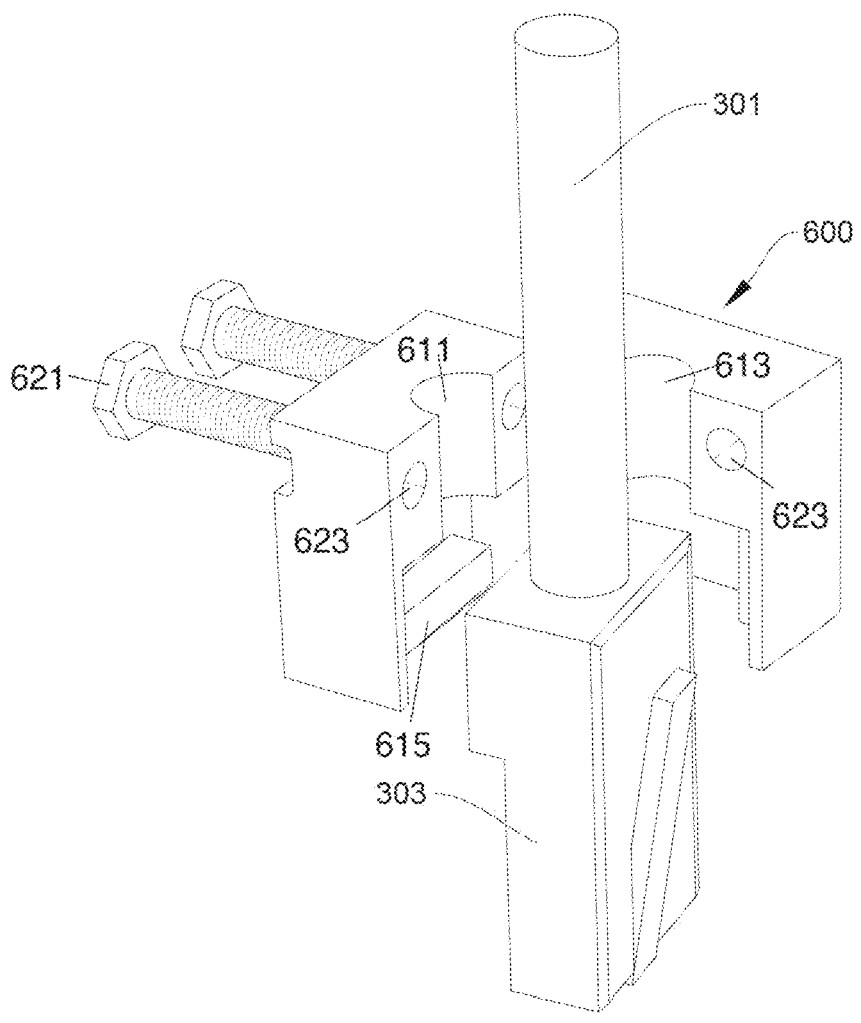
FIG. 24 is a perspective side view of an embodiment of a cable plug connector in an open cable connector locking cover.

As shown in FIG. 24, a cable connector plug 303 and a connected cable 301 can be placed in the open locking cover 600. The cable connector plug 303 can be fully inserted into a port on the AP network equipment. Then, the first cover piece 601 can be put under the bottom side of the electrical connector 303 with the locking protrusion 615 inserted into the recess 305 on the bottom side of the electrical connector 303. The second cover piece 603 can then be rotated around the hinge 605 making the locking cover 600 surround the cable connector plug 303. The cable connector plug 303 can be contained in a recess formed by the first connector recess 607 and the second connector recess 609, and cable 301 can be contained in a recess formed by the first cable recess 611 and the second cable recess 613. The top surface of the cable connector plug 303 can rest on the planar surface 617, and the locking latch and the latch lever can be contained in the latch recess 619. The two screws 621 can be driven into the corresponding thread holes 623 to secure and lock the two cover pieces 601, 603 to each other.

Figure 25:
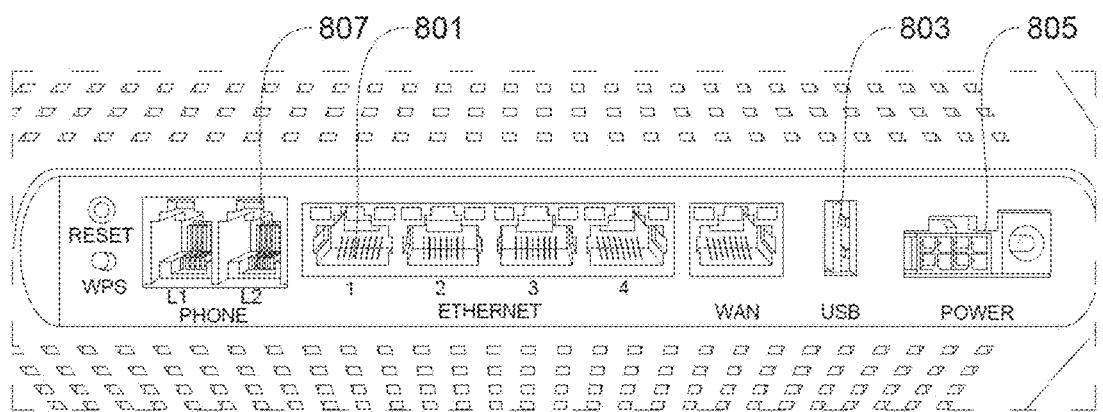
FIG. 25 illustrates a side view of an embodiment of an AP network equipment having various power, communications, and telephone ports.

FIG. 25 illustrates an example of a jack port portion of an AP network device 800 having multiple ports. In this example, the AP device 800 has four RJ ports 801, one USB port 803, one power jack port 805, one wide area network (WAN) port, and two phone jack ports 807. In addition to the ports, this portion of the AP network device can also have a reset switch and a WiFi protected set up (WPS) button.

In some embodiments, locking cable covers can be designed for specific configurations of cable connectors on specific AP network equipment. For example, a single cover assembly can be used to prevent tampering with the authorized cables inserted into any of the RJ ports 801, USB port 803, power jack port 805, wide area network (WAN) port, and phone jack ports 807 connected to the AP device 800.

Figure 26:
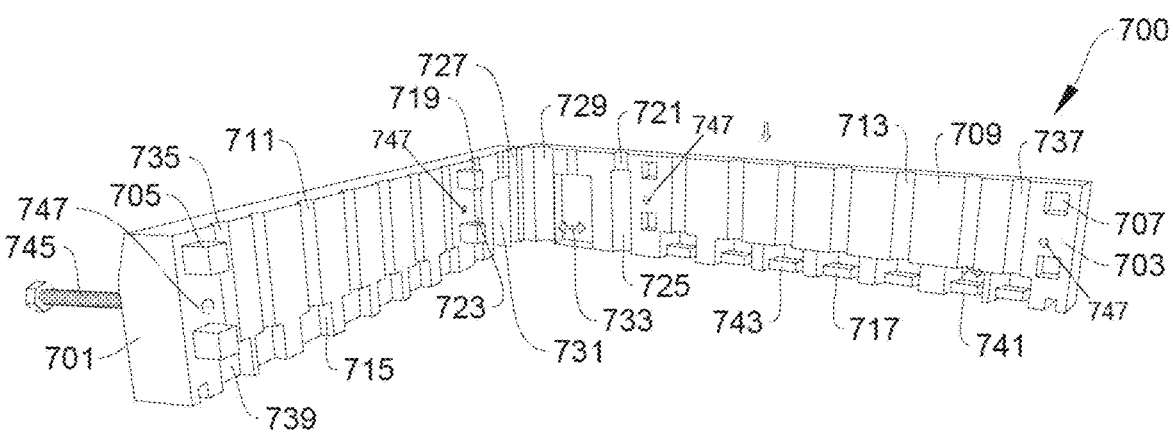
FIG. 26 illustrates a side perspective view of an embodiment of a hinged locking cover for multiple cable connectors.
Figure 27:
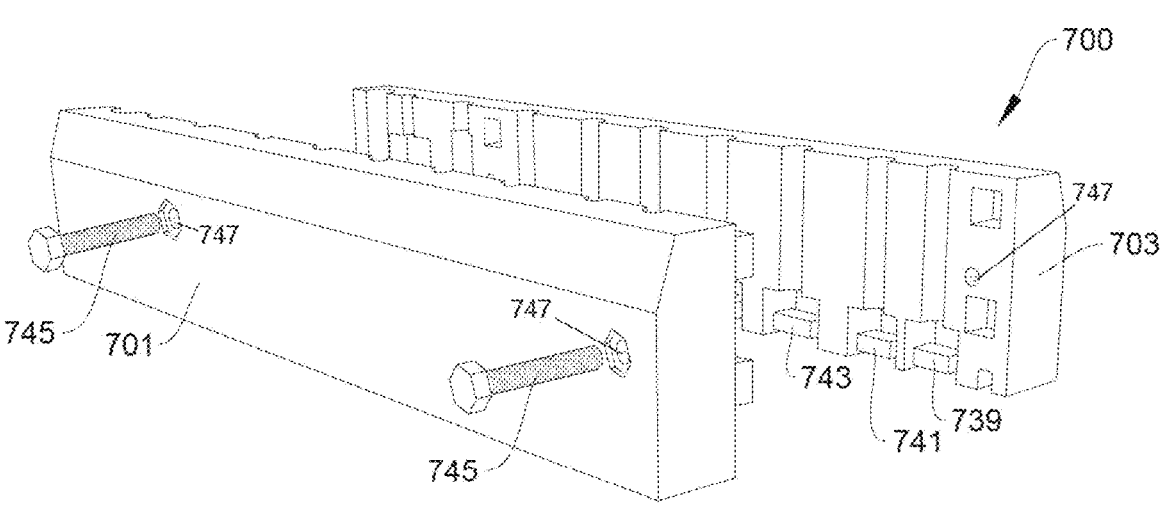
FIG. 27 illustrates a side perspective view of an embodiment of a locking cover for multiple cable connectors.
Figure 28:
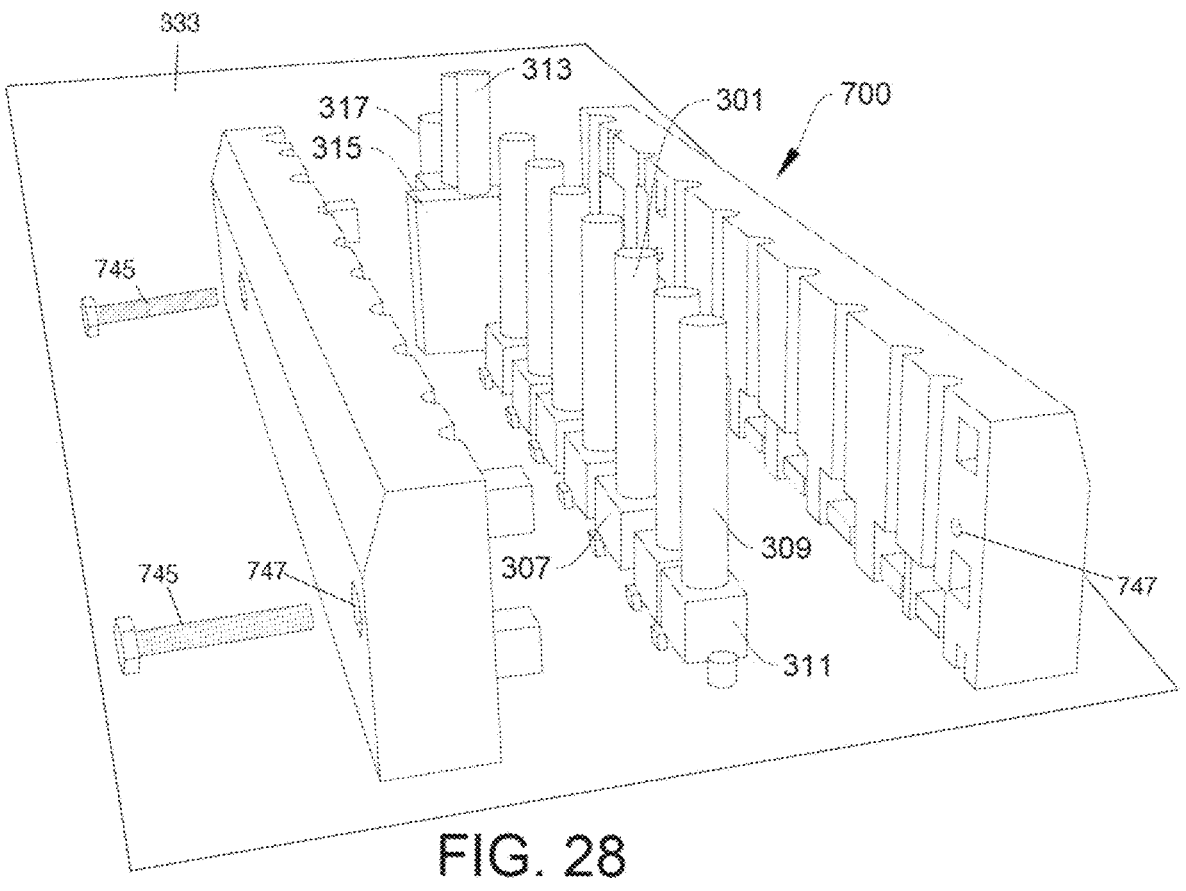
FIG. 28 illustrates a side perspective view of an embodiment of a locking cover for multiple cable connectors with multiple cables and cable connector plugs extending out of AP network equipment ports.

The inventive cover can also cover and prevent the actuation of the reset switch and the WiFi protected set up (WPS) button. FIGS. 26-28 show multiple embodiments of a locking cover that can cover multiple cable connectors as well as other types of connectors. In this embodiment, the locking cover 700 is specifically designed for the AP device 800 as shown in FIG. 25. The locking cover 700 can have a first upper cover piece 701 and a second lower cover piece 703. The upper cover piece 701 can have aligning protrusions 705, and the lower cover piece 703 can have corresponding aligning recesses 707 that are adapted to contain the aligning protrusion 705 when the upper cover piece 701 is fastened to the lower cover piece 703. The mating of the aligning protrusions 705 and the corresponding aligning recesses 707 can insure that the upper cover piece 701 is properly aligned with the lower cover piece 703 when the locking cover 700 is assembled. FIG. 26 illustrates a cover assembly having an upper cover piece 701 coupled to a lower cover piece 703 with a hinge at one end and fasteners at an opposite end. FIGS. 27 and 28 illustrate a cover assembly having a separate upper cover piece 701 and a separate lower cover piece 703 coupled to each other with fasteners.

In the embodiments illustrated in FIGS. 26-28, the first upper cover piece 701 can have multiple cable recesses that match the ports on the AP network equipment. The cover pieces 701, 703 can have USB cable recesses 711, 713, 719, 721, power cable recesses 727, 729, 731, 733, and phone cable recesses 735, 737, 739, 741. Each of the RJ connector recesses 717 and phone jack connector recesses 741 can also each have a locking protrusion 743 that engages the recesses on the bottom surface of the RJ connectors and the phone jack connectors.

With reference to FIG. 28, when the cover components have been assembled around the authorized cable connectors and plugs that are in the ports of the AP network equipment 333, the first upper cover piece 701 can be locked and secured to the second cover piece 703 with one or more threaded bolts or screws or other fasteners 745. In this embodiment, there can be multiple tread and/or unthreaded holes 747 provided in the cover pieces 701, 703, and two screw fasteners 745 can be placed into the holes 747 and tightened against a threaded structure to locked and secured the two cover pieces 701, 703 to each other. The heads of the fasteners 745 can have proprietary driving features that can prevent unauthorized users from removing the fasteners 745 to access the ports of the AP network equipment 333. A proprietary tool may be required to unscrew the threaded fasteners from the cover pieces 701, 703.

As shown in FIG. 28, the locking cover 700 can cover multiple cable connectors including the RJ connector plug 307, phone connector plug 311, and USB connector 315. The second cover piece 703 can be put under the bottom side of the connector plugs letting the locking protrusion 743 engage the recess 305 on the bottom side of the connector plugs. Then the first cover piece 701 can be put above the top side of the connector plugs letting the aligning protrusion 705 on the first cover piece 701 engage the aligning recess 707 on the second cover piece 703. All the connector plugs can be contained in recesses formed by the paired recesses on the two cover pieces 701, 703, and all the cables can be contained in recesses formed by the paired recesses on the two cover pieces. The two screws 745 can be driven into the corresponding thread holes 747 to secure and lock the two cover pieces 701, 703 to each other.

Figure 29:
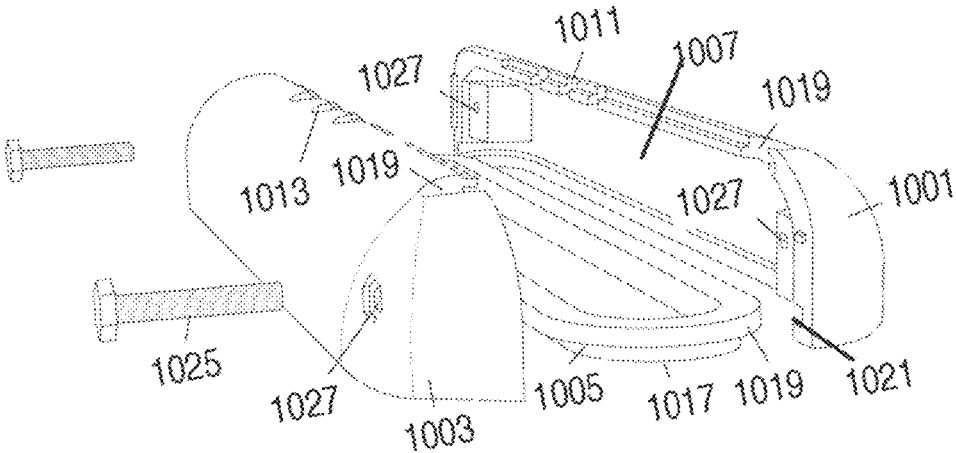
FIG. 29 illustrates an exploded side view of an embodiment of a locking cover for cable connectors in AP network equipment ports.
Figure 30:
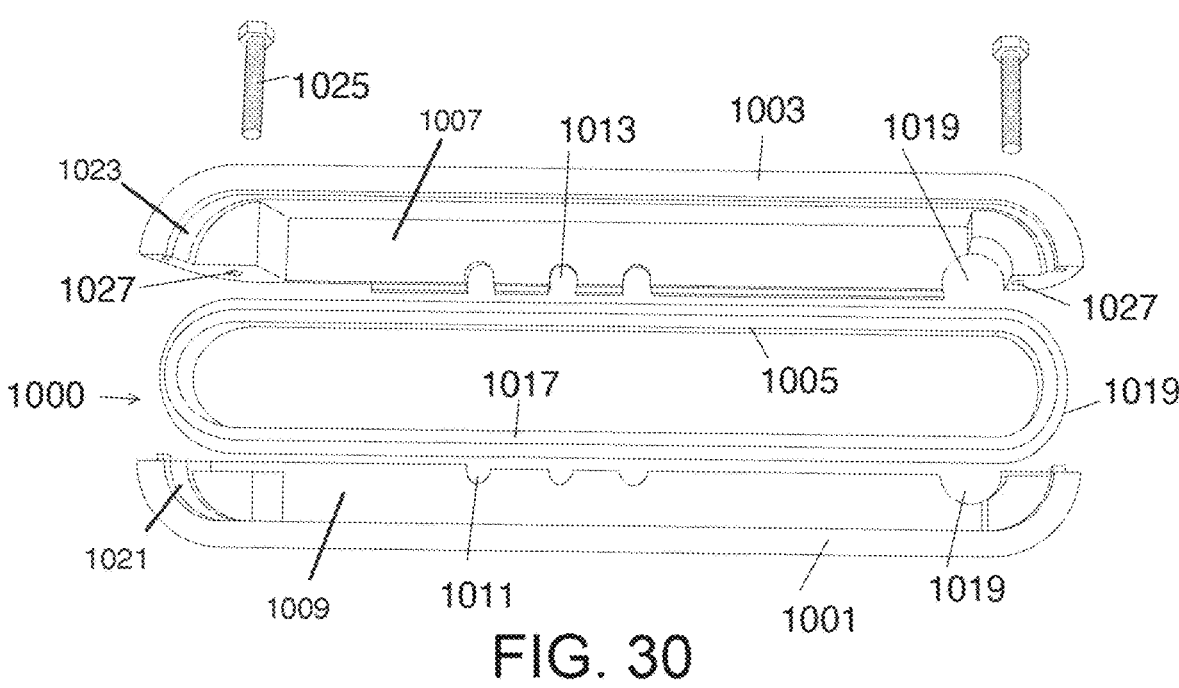
FIG. 30 illustrates an exploded front view of an embodiment of a locking cover for cable connectors in AP network equipment ports.
Figure 31:
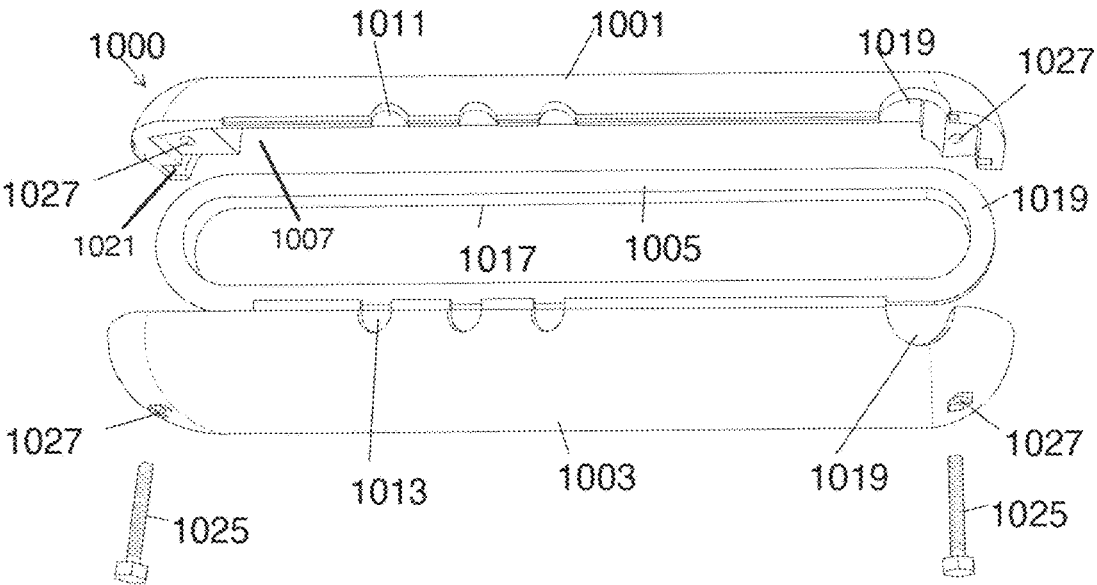
FIG. 31 illustrates an exploded rear view of an embodiment of a locking cover for cable connectors in AP network equipment ports.

FIGS. 29-31 illustrate another embodiment of a locking cover that can be secured to the AP network equipment to cover multiple cable ends and cable connectors. In the embodiment, the locking cover 1000 can have a first cover piece 1001, a second cover piece 1003, and a locking ring 1005. The first cover piece 1001 can have multiple first cable openings 1011, a first recessed volume 1007, and a first slot 1021 adjacent to the front edge. The second cover piece 1003 can also have multiple second cable openings 1013, a second recess volume 1009, and a second slot 1023 adjacent to the front edge. The locking ring 1005 can have a first cable facing surface 1015 and a second equipment facing surface 1017. The locking ring 1005 can have an oval shape and the equipment facing surface 1017 can be rigidly secured to the AP network equipment adjacent to and around the ports. The locking ring 1005 can have an L-shaped cross section that forms a flange 1019. When the first cover piece 1001 and the second cover piece 1003 are secured to the locking ring 1005, the flange 1019 can fit with both the first slot 1021 and the second slot 1023. This can cause the first cover piece 1001

Thread or unthreaded holes 1027 can be provided at various locations on the cover pieces 1001, 1003 and threaded fasteners can be used to secure and lock the cover pieces 1001, 1003 to each other around the locking ring 1005. In this embodiment, there can be two tread holes 1027 provided at both side end of the cover pieces, and two screws 1025 can be driven into the corresponding thread holes to rigidly couple the two cover pieces 701, 703.

The locking cover 1000 can cover multiple cable connectors. The locking ring 1005 can be attached to a back side of an AP device with multiple ports/jacks. In some embodiments, the second surface 1017 of the locking ring 1005 can be glued onto the back side of the AP device. The first cover piece 1001 and second cover piece 1003 can be put together with the first slot 1021 and the second slot 1023 engaging the flange 1019 of the locking ring 1005. The first cable opening 1011 and the second cable opening 1013 can form a cable opening through which cables coupled to the cable connection plugs can pass through.

In the locking cover embodiment illustrated in FIGS. 29-31, there are three smaller diameter communications cable openings 1011 and a larger diameter power cable opening 1019. In other embodiments, there can be different numbers of communications cable openings with different sizes, depending on the number, arrangement, and types of cables being connected to the ports of the connected AP network device. All the connector plugs can be partially within the space between the two assembled cover pieces 1001, 1003. The diameters of the holes formed by openings 1011, 1013 can be between about 2-6 millimeters in diameter. The power cable hole 1019 diameter can be between about 4-7 millimeters in diameter. The screw fasteners 1025 can have a proprietary driving feature head and can be screwed into the corresponding thread holes 1027 to lock the two cover pieces to each other. These fasteners 1025 may only be screwed into and removed from the cover pieces 1001, 1003 using a proprietary tool.

Figure 32:
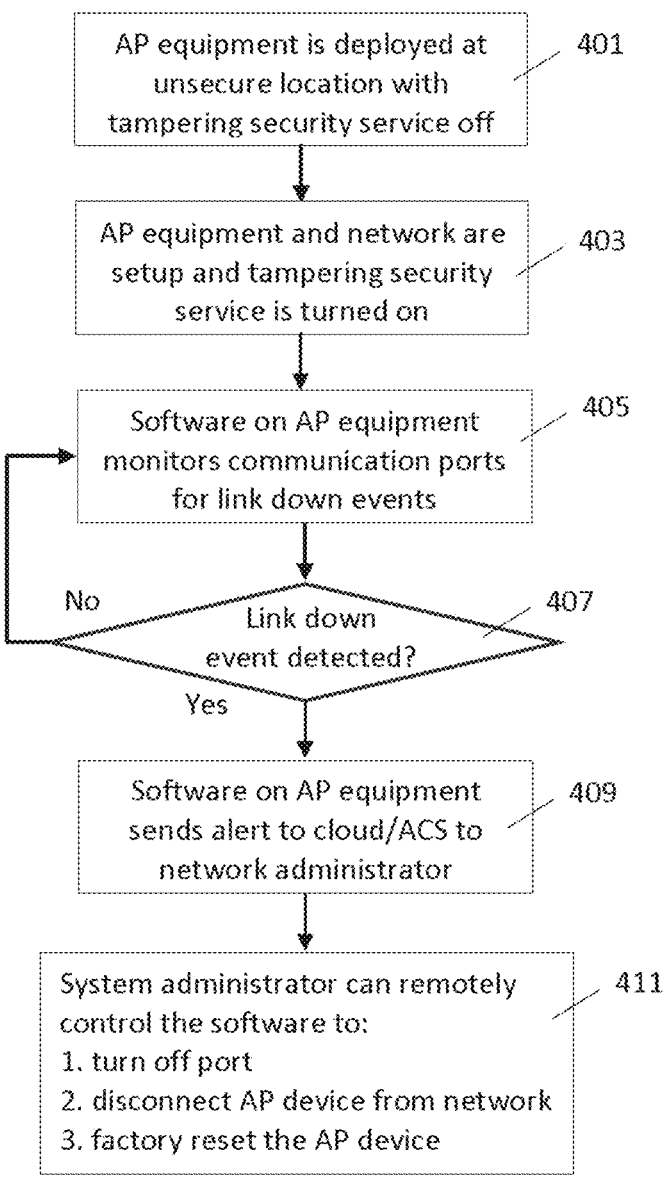
FIG. 32 is a flowchart of an embodiment of a process for providing a basic-level tampering security service for AP network equipment.

In some embodiments, software can be used alone or in combination with the described locking plugs and connector covers to provide additional tamper resistant security services to the AP network equipment. FIG. 32 is a flowchart illustrating how tamper detection software can provide a basic-level tampering security service to AP network equipment. The software can be programmed and/or configured to notify the network administrator if a link down event is detected. The network administrator can remotely control the software via a mobile App, GUI, CSC, etc.

The combination of locking connector plugs and a locking cover with tamper detection software can provide notifications and allow a system administrator to remotely implement additional network equipment security. The AP network equipment is installed at a location and tamper detecting software can be installed. When the AP network equipment is first installed, the security software services can be turned off 401. The AP network equipment can be connected to other network system components with the required communications cables and other cables plugged into available communications ports. All the empty communications ports are plugged in with locking connector plugs that can have electrically coupled conductors as described above. The conductive connectors 131 of the locking connector plugs can be electrically coupled to each other as described above with reference to FIG. 19 and closed circuits can be formed when the locking connector plug is inserted into the open RJ jack ports of the AP network equipment. Thus, the status of all the RJ jack or other communications ports can be detected by the tamper detecting software running on the AP network equipment.

Once the AP equipment and network are set up, the tampering service is turned on 403. The software monitors communications ports for link down events 405. Link down events occur when a communications cable is removed from a port of the AP network equipment. Conversely, link up events occur when a communications cable is plugged into a port. If the software detects the link down event 407, for example, one of the locking connector plugs or one of the authorized communications cable connectors has been removed from one or more of the ports of the AP network equipment. The tamper detection software can respond by sending an alert through cloud/ACS service to the network administrator 409. The administrator can remotely control the software to perform various actions to the AP network equipment including: 1. turning off the port that had the detected link down, 2. disconnecting the AP equipment from the network, or 3. factory resetting the AP network equipment 411.

Figure 33:
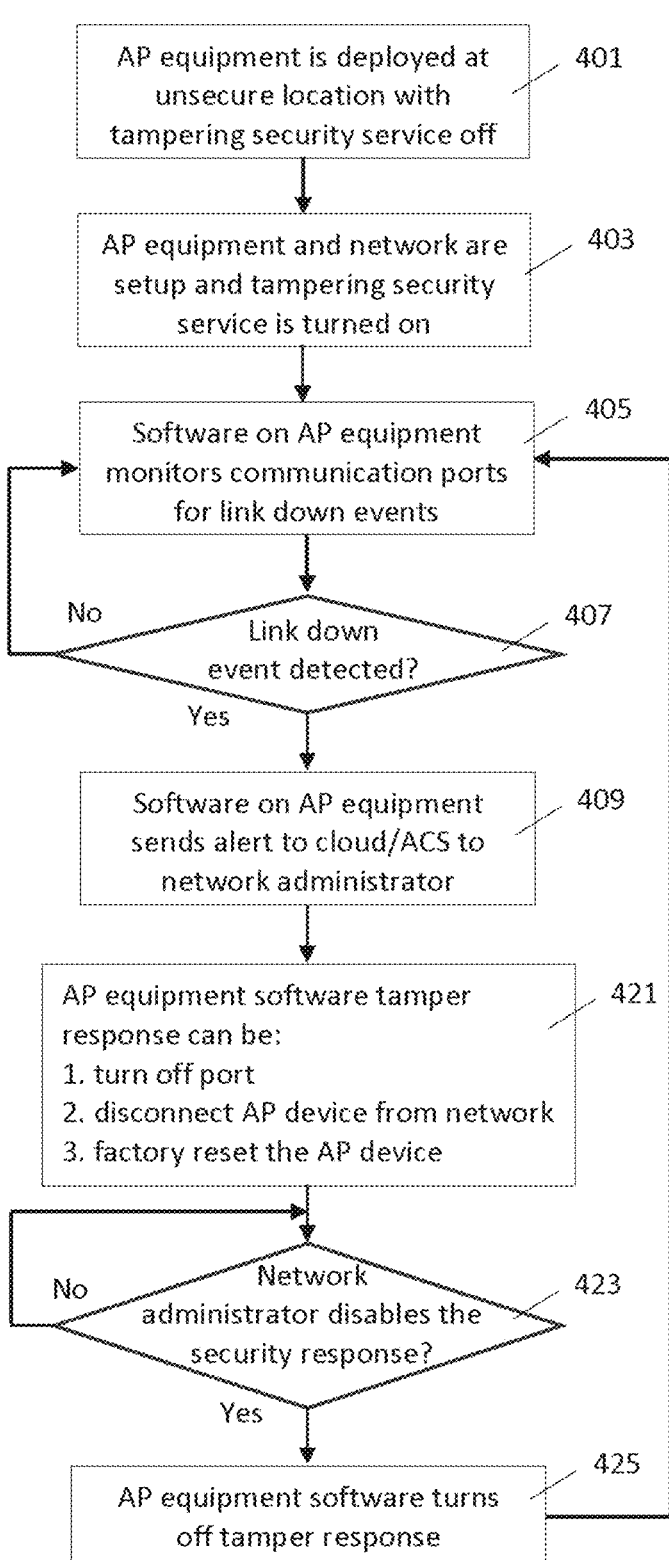
FIG. 33 is a flowchart of a process for providing an intermediate-level tampering security service for AP network equipment.

In some embodiments, software can be used to provide automated tampering security service to the AP network equipment. FIG. 33 is a flowchart reflecting how to use a software to provide an intermediate-level automated tampering security service to AP network equipment. The software can be programmed and/or configured to react to different tampering conditions detected on a RJ jack or other communications port of the AP equipment. The tampering security services can be configured, turned on or turned off by a network administrator via a computing device via an App, GUI or CSC, etc.

The AP equipment is deployed at an unsecured location with the tampering security service off 401. The RJ jack ports of the AP equipment are coupled to authorized communications cable and all the empty RJ jack ports can be plugged with the locking connector plugs with conductive connectors 131 that are electrically coupled to each other. Again, the status of all RJ jack ports can be detected by the tamper detection software running on the AP network equipment.

Once the AP equipment and network are set up, the tampering service is turned on 403. The software monitors communications ports for link down events 405. If the software detects the link down event 407, for example, one of the locking connector plugs has been unplugged, the software will send an alert to cloud/ACS to the network administrator 409. The tamper detection software can also automatically instruct the AP equipment to perform various response actions. For example, tamper detection software can automatically instruct the AP equipment to: 1. turn off the port with the detected link down, 2. disconnect the AP equipment from network, and/or 3. factory reset the AP equipment 421. The network administrator can investigate the link down notification. If the notification is in response to unauthorized activity, the administrator can allow the software to continue to disable some or all of the AP network equipment. If the notification is in response to authorized activity, the administrator can remotely disable or turn off the security response 423.

The system administrator can remotely instruct the tamper detection software to turn off the tamper response 423. The tamper detection software can respond to the administrator instructions by turning off the tamper response 423 and returning to monitoring the communications ports for link down events 405. This configuration can provide higher level automated security to the AP network equipment.

Figure 34:
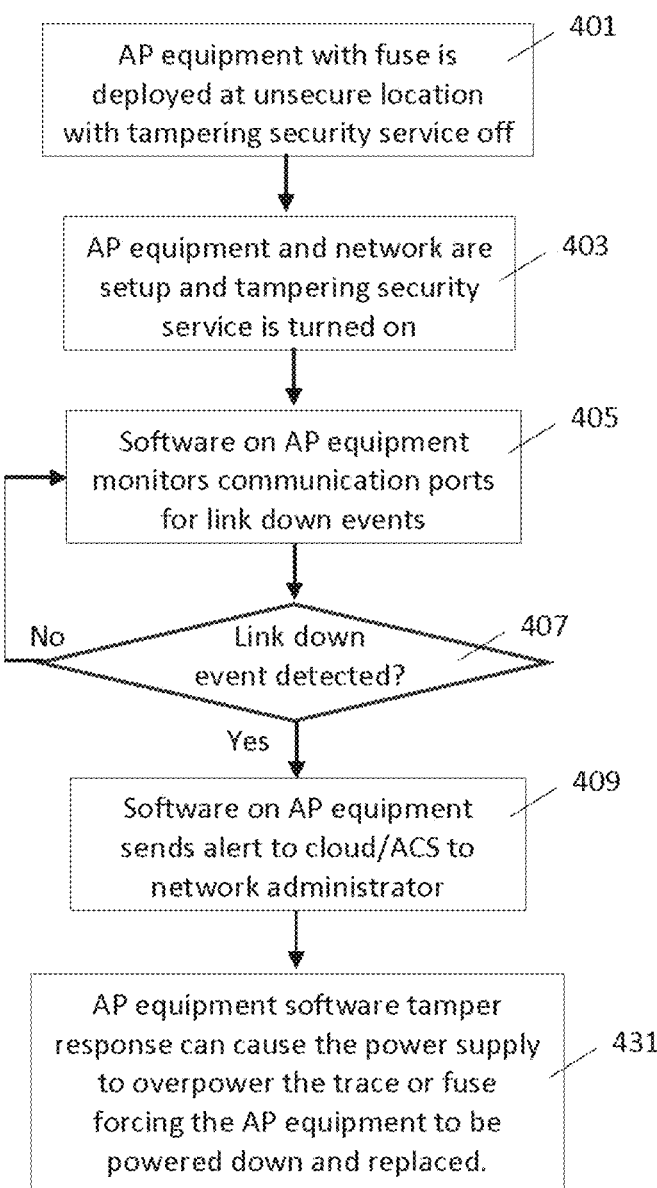
FIG. 34 is a flowchart of an embodiment of a process for providing a high-level tampering security service for AP network equipment.

In some embodiments, the AP network equipment can be used with high security data and networks. In these embodiments, it may be necessary to destroy or disable the AP network equipment when tampering is detected. The AP network equipment can use a thin PCB trace or a fuse can be destroyed in response to detected tampering to provide the highest level of security. FIG. 34 is a flowchart reflecting how to use a software and a thin PCB trace or a fuse to provide a high-level tampering security service to AP network equipment.

The AP equipment with a thin trace or a fuse is deployed at an unsecured location with the tampering security service off 401. The RJ jack ports of the AP equipment with links are plugged in, and all the empty RJ jacks are also plugged in with the locking connector plugs described above. As also described above, since the conductive connectors of the locking connector plug are electrically coupled to each other, a closed circuit is formed when the locking connector plugs are inserted into the RJ jack ports. Thus, the status of all the RJ jack or other communication ports can be detected by the tamper detection software running on the AP network equipment.

Once the AP equipment and network are set up, the tampering service is turned on 403. The software monitors communications ports for link down events 405. If the software detects the link down event 407, the software will send an alert to cloud/ACS to the network administrator 409 and the tamper detection software can cause the power supply to overpower the thin trace or fuse. The excess power will destroy the thin trace or fuse forcing the AP network equipment to be powered down. The AP network equipment can be damaged and in order to restore the AP network equipment, the thin trace or fuse or the entire AP network equipment must be replaced 431. This configuration can provide the highest level of security.

Figure 35:
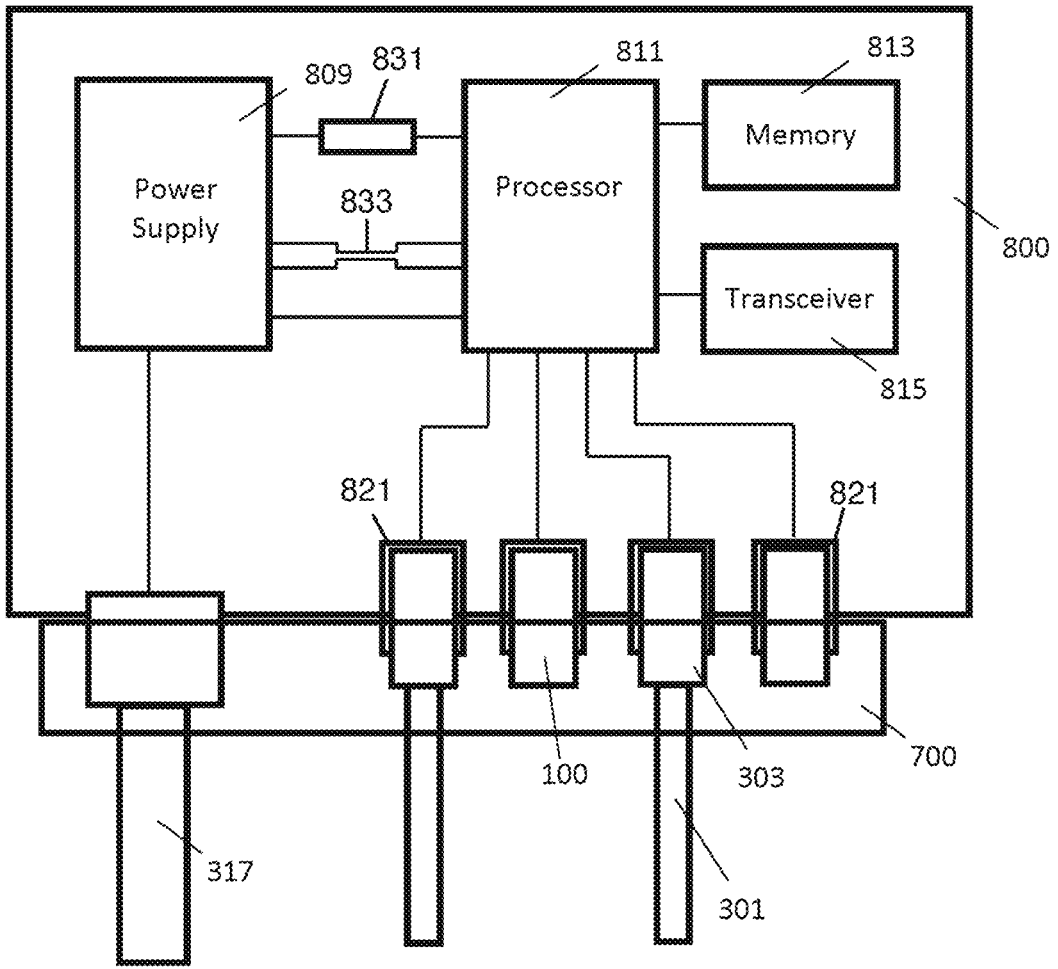
FIG. 35 is a block diagram of an embodiment of an AP network equipment with locking connector plugs, a locking cover over multiple cable connector plugs.

FIG. 35 illustrates a block diagram of an embodiment of the AP network equipment described in the flow charts. The AP network equipment 800 can have a processor 811 coupled to memory 813, a transceiver 815, and a power supply 809. A power cable 317 can be electrically coupled to the power supply 809 and a plurality of communications connectors 303 can be inserted into communication ports 821 that are coupled to the processor 811. A fuse 831 or a thin trace 833 can placed in a main electrical power supply to the other device components. Each of communications port 821 can be filled with either a communications cable connector 303 or a locking connector plug 100. A locking cover 700 can cover the power supply connector 317, the RJ cable connector 303 and the locking connector plug 100.

During the set up process, the AP network equipment 800 is configured and the normal operating signals from the communications ports 821 and the set up configuration can be stored in memory 813. When the tamper detection software is running, it can detect any changes in the normal operating signals by comparing them to the stored normal operating signals. Alternatively, the tamper detection software can detect link down and/or link up events. When tampering is detected, the processor can send an alert to cloud/ACS to the network administrator through the transceiver 815. The processor 811 can also respond to the tamper detection software and administrator instructions received by the transceiver 815 by deactivating any port 821, disabling the AP network equipment 800. The processor 811 can also respond to administrator instructions by reactivating any port 821 or enabling the AP network equipment 800. In a highest security configuration, the processor 811 can increase the output of the power supply 809 to destroy the fuse 831 or destroy the thin trace 833 to permanently disable the AP network equipment 800.

FIG. 36 shows an embodiment of an administrator user interface (UI) layout corresponding to the process described above with reference to FIG. 32. The administrator UI layout includes an information display message 851 indicating which port of which AP device has been tampered in the network, a question display 853 asking "how would you like to respond?" A first button 855 can be actuated to turn off the port having the detected tampering. A second button 857 can be actuated to disconnect the tampered AP device from the network. A third button 859 can be actuated to reset the tampered AP device. If any of these buttons 905, 907, 909 is actuated, the administrator computing device can transmit instructions back to the AP device.

FIG. 37 shows an embodiment of an administrator user interface (UI) layout that can be displayed after the AP device has deactivated a port or the entire AP device. The administrator UI layout can include an information display message 851 indicating which port of the AP device that tampering has been detected. The UI can also provide a display 863 indicating which operation has been taken by the software. A first button 865 can be actuated to turn on the tamper detected port, and a second button 867 can be actuated to reconnect the tampered AP device to the network. If either of these buttons 865, 867 is actuated, the administrator computing device can transmit instructions back to the AP device.

FIG. 38 illustrates an embodiment of an administrator UI layout in a high security configuration. The UI includes an information display 851 indicating which port of the AP network device that tampering has been detected, and an operation display indicating that the tampered AP network device was disabled or destroyed 869. The administrator can respond by going to the AP device location or sending a technician and investigating the tampering incident.

In some embodiments, the inventive system can include a plurality of AP devices that can communicate with a cloud/ACS service that can be used to detect tampering and prevent or mitigate unauthorized access to networked systems and data. As discussed above, the tamper detection system can have three different security levels such as basic, intermediate, and high-level responses. In other embodiments, there can be any number of different and distinct security response levels. In some embodiments, the AP devices' selection between the different available levels of tampering security service can be automatic and static. In other embodiments, the AP devices' selection between different security response levels can be dynamic and variable. In some embodiments, the AP devices can be configured to detect tampering and automatically respond by implementing a security response and transmitting the tampering information to a cloud/ACS service. In other embodiments, the AP devices can detect tampering and transmit the tampering information to a cloud/ACS service that can transmit security response instructions to the AP devices.

In static embodiments, the type of response to tampering can be predetermined or configured by the service provider during the deployment of AP devices. For instance, an AP device can be configured with either a basic, an intermediate or a high-level response to detected tampering. The static tamper response can be stored in a memory of the AP device. When tampering is detected, the AP device can always respond to detected tampering with the preset response level. Since the response is always the same after the AP device is configured, the response to detected tampering is static. In other embodiments, the tamper detection data can be transmitted to a system server that can then transmit the static tamper response instructions back to the AP device. The AP device can receive the static tamper response instructions and perform the instructed static tamper response actions.

In dynamic embodiments, the selection between the different response levels to tampering can be determined dynamically by the service provider and/or the AP device based on internal and/or external triggers and predetermined tamper response rules. In contrast to static response configuration, an AP device can apply an appropriate response level based on the detected tampering, internal and/or external trigger factors. These factors can be applied as inputs to a set of tamper response rules that can provide a dynamic tamper response to the AP device. In some embodiments, the tamper response rules can be set and stored when the AP device is deployed. The tamper response rules can also be updated remotely after the AP device is deployed. This enables the tamper response rules to be updated before and/or after any detected tampering. A processor in the AP device can apply the factors to the tamper response rules and provide an automatic tamper response for the AP device. In other embodiments, the tamper detection data can be transmitted to a system server that can apply the factors to the tamper response rules and then transmit dynamic tamper response instructions or signals back to the AP device. The AP device can respond to the dynamic tamper response instructions by performing the instructed dynamic tamper response actions.

In some embodiments, internal triggers can be applications and services running on the AP devices which may raise up or down the level of security responses based on various types of triggers. These triggers can include: different types of detected tampering, user's accessing of problematic websites known for illegal activity through the AP device, and/or at use of AP devices at particular times. Low level tampering can result in a lower level security response such as shutting off the AP device port where tampering was detected. Higher level tampering can result in a higher level response such as shutting down the AP device and disconnection from the network.

In some embodiments, the tamper response rules can alter the tamper detection response based upon the location of the AP device. An AP device in a public location can be accessible and can be more likely to be attacked by a public individual than an AP device in a more secure private location that may only be accessible by vetted employees. The tamper response rules for AP device deployed in a public place such as a park or public building can apply a higher level of tamper detection response to detected tampering. In contrast, the tamper response rules for AP device deployed in a more secure and private location such as a home or office can apply a lower level of tamper detection response by the AP device to detected tampering.

In other embodiments, the tamper response rules may provide different tamper responses when the AP device is used to provide access to different websites. For example, tamper detection during AP device access to a closed portal can result in a higher tamper detection response level than tampering detected during access to the open internet or a paywall that can have a lower tamper detection response. In some embodiments, the AP device can have an integrated global positioning system (GPS) sensor that can identify the location of the AP device. The GPS location data can be processed and to determine if the AP device is in a public or private location. The AP device and/or a cloud based AP device management system having an Auto Configuration Service (ACS) can adjust the security response applied to the AP device based on the location.

Similarly, an AP device with access to the open internet may dynamically raise or lower the tamper response level of security. Normal internet access through the AP device can be acceptable without any tamper detection response being implemented. However, if the AP device detects a user accessing or attempting to access known black-listed websites or problematic applications, this action can be a tamper detection trigger that can result in an immediate or high level tamper detection response. For example, if the system detects a user using the AP device to access the "dark web" or a known online black market site. This factor applied to the tamper response rules can result in an immediate security response such as shutting off the associated AP device port or disconnecting the AP device from the network. Similarly, if the AP device detects the receipt or transmission of a computer virus, the tamper response rules can apply a tamper response that disconnects the AP device from the network or resets the AP device to prevent the virus from spreading.

In some embodiments, external triggers can be conditions outside of the AP device which may raise up or lower down the level of the security responses for the AP devices in the network. For instance, an AP device deployed in an event-based location, such as a farmer's market or concert venue, may have different variable levels of security responses based on the properties of the event. Properties of the event that can be applied to the rules to alter the tamper security response can include: volume of human traffic at the event, duration of the event, time of day of the event, historical data of past tampering for the event, geographic location of the event, type of access provided before, during and after the event, etc. The tamper responds can be set to higher level security responses for events that have one or more of the security trigger conditions: large numbers of people, confinement within a secure location for an extended time period at an event that can have a past history of tampering such as a computer hackathon.

In some embodiments, a plurality of AP devices can be coupled to form a network providing access points to a large area and a large number of people. A security response by a detected tampering at a single AP device in the network may trigger additional security responses from one or more of the other AP devices deployed on the same network, even when no tampering is actually detected on these separate AP devices. This implementation enables a broadband service provider to build virtual clusters of outdoor devices which can preemptively adjust their security response to the tampering of one or more AP devices on the network, raising the overall security of a deployed cluster automatically based on preset rules.

In some embodiments, a broadband service provider can set many more levels of responses by combining multiple security response levels described above with internal and/or external triggers to form more complex responses. Further, in some embodiments, the AP devices can be user configurable with multiple levels of customizable detected tamper responses that can be set by a network administrator through each AP device or through the cloud based management system/ACS service.

In some embodiments, the tampering security service can have dynamic responses for AP devices deployed in group network equipment. Multiple AP devices can be placed into different groups of equipment maintained by a cloud based server system. Group membership for the AP devices can be based on different factors, like geographic location, installation location, hours of operation, etc. If the software detects tampering on one AP device, all other AP devices in the same group can receive a network AP device tamper signal, and all of the AP devices in the group can automatically elevate the tampering response. Alternatively, the tamper signal can be transmitted from a single AP device to the cloud server that can then instruct all other AP devices in the network group to implement an appropriate rule based increased security response. In some embodiments, the security responses can start off as low level and escalate based on the number of tampering detections detected by the AP devices in the group. For example, if a single tampering event is detected, a low level security response can be implemented to the AP devices in the group. If three tampering events are detected, a medium level security response can be implemented to all AP devices in the group. If six tampering events are detected, a high level security response can be implemented that can effectively shut down all AP devices in the group. In other embodiments, the rules can be adjusted when the system is set up to any predetermined number of detected tampering events to escalate the security response for the AP devices.

Figure 39:
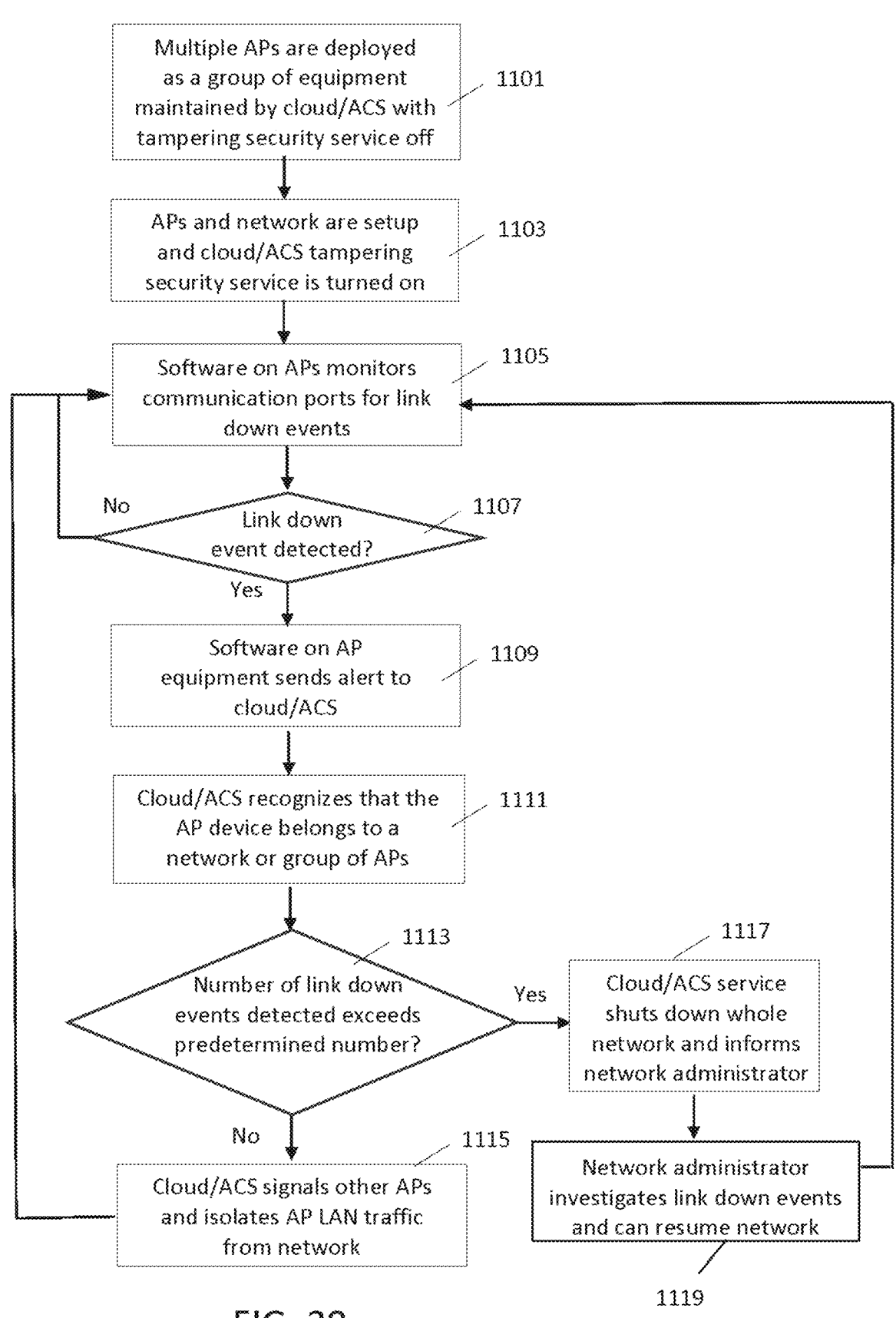
FIG. 39 is a flowchart for an embodiment of a process for providing a tampering security service with dynamic responses for group AP network equipment.

FIG. 39 is a flowchart for an embodiment of a process for providing a tampering security service with dynamic tamper detection responses for a group of AP network equipment. Multiple AP devices are deployed into a group of equipment at a physical location that requires multiple access points. The group of AP devices can be maintained and controlled by a cloud/ACS service running on a cloud based server. During the installation and set up process, the cloud/ACS tampering security service can initially be turned off 1101. The group of AP devices in the system network can be grouped based on their location or general proximity to each other.

The multiple AP devices can be distributed at various points across the desired location area and each of the AP devices can be connected to power and coupled to other equipment for the network to be properly set up. The desired tamper detection rules system can also be selected or installed of the AP devices or cloud server during the set up process. Once the AP devices and cloud server have been fully configured with the required hardware and the desired tamper detection rules, the cloud/ACS tampering security service can be turned on 1103.

During normal operations, the software on the multiple AP devices can monitor the communication ports for tampering events such as link down events 1105. As described above, link down events occur when a communications cable is removed from a port of the AP device. If the software detects the link down event 1107, such as removal of a locking connector plug or removal of an authorized communications cable connector from one or more of the ports of the AP devices, the software on the AP equipment can send an alert to the cloud/ACS service 1109.

The cloud/ACS service can be used to monitor and control many AP devices. The cloud/ACS service can recognize that the AP device that transmitted the tamper alert belongs to a specific group of AP devices 1111. The cloud/ACS service can respond to the alert by transmitting escalated tamper response instructions to the AP device that transmitted the alert alone, AP device in the vicinity of the device that transmitted the alert, or all of the AP device in the network. The AP devices receiving the instructions can be based on the rules that the cloud/ACS service are applying to the tamper detection.

The AP devices in the network can communicate with the cloud server and the link down events can be transmitted to the cloud server. In some embodiments, the cloud/ACS service can count the number of link down events for each of the AP devices in the network. If the number of detected link down events is greater than one but does not exceed a predetermined number 1113 set in the rules, a medium level response can be applied. For example, the cloud/ACS service can instruct the AP device with the detected tampering to disconnect from the LAN traffic and the cloud/ACS service can instruct the other AP devices in the group to isolate AP LAN traffic from network 1115. The cloud/ACS service can inform the network administrator of this tamper response action who can investigate the detected tampering and cloud/ACS service response. The network administrator may either maintain or change the tamper response to either raise or lower the tamper response instructions to the AP devices.

If the number of detected link down events exceeds a predetermined number 1113 set in the rules, the cloud/ACS service can implement a higher level tamper response. For example, the cloud/ACS service can instruct all AP devices in the network to shut down or reset to effectively shut down the whole network. The cloud/ACS service can inform the network administrator 1117. The network administrator can again investigate the link down events and the cloud/ACS service response. The network administrator may either maintain or change the tamper response to either raise or lower the tamper response instructions to the AP devices. For example, if the detected tampering has been resolved, the network administrator can remove the tamper responses so that the network can resume normal operations 1119.

The tamper rules can be configured as required for the AP device installation by the AP network administrator. In an embodiment, a detected link down event may initially have a low level response and then escalate the response if more than a predetermined number of link down events are detected within a predetermined period of time. For example, the system may respond to a single link down or other tampering event in a one hour time period by turning off the link down port on the AP device. If three link down or other tampering events are detected in an hour, the rules can disconnect the AP device from the network or perform a factory reset of the AP device to disable it from the network. If five link down or other tampering events are detected at multiple AP devices in the network within one hour, the rules can require that the entire network be shut down.

In some embodiments, the cloud/ACS service can automatically reduce the tamper response level based upon the applied tamper rules. For example, the cloud/ACS service increased the tamper response during a public event and the public event has ended and 12 hours have passed since any possible tampering has been detected. The rules can allow the cloud/ACS service to instruct the AP devices in the network to lower their tamper responses so that the system can resume normal operations.

The AP device network can also allow a network administrator to manually control the tamper responses of the AP devices. As discussed, the cloud/ACS service can inform the network administrator when any changes to the tamper response are implemented by the AP devices. The network administrator can investigate the circumstances of the detected tampering and the corresponding cloud/ACS service response. The network administrator may either maintain or change the tamper response to either raise or lower the tamper response instructions to the AP devices. For example, if the network administrator determines that the detected tampering was a result of authorized AP device maintenance, the network administrator can instruct the cloud/ACS service to instruct the AP devices to cancel or lower the tamper response instructions so that the network can function normally.

Figure 40:
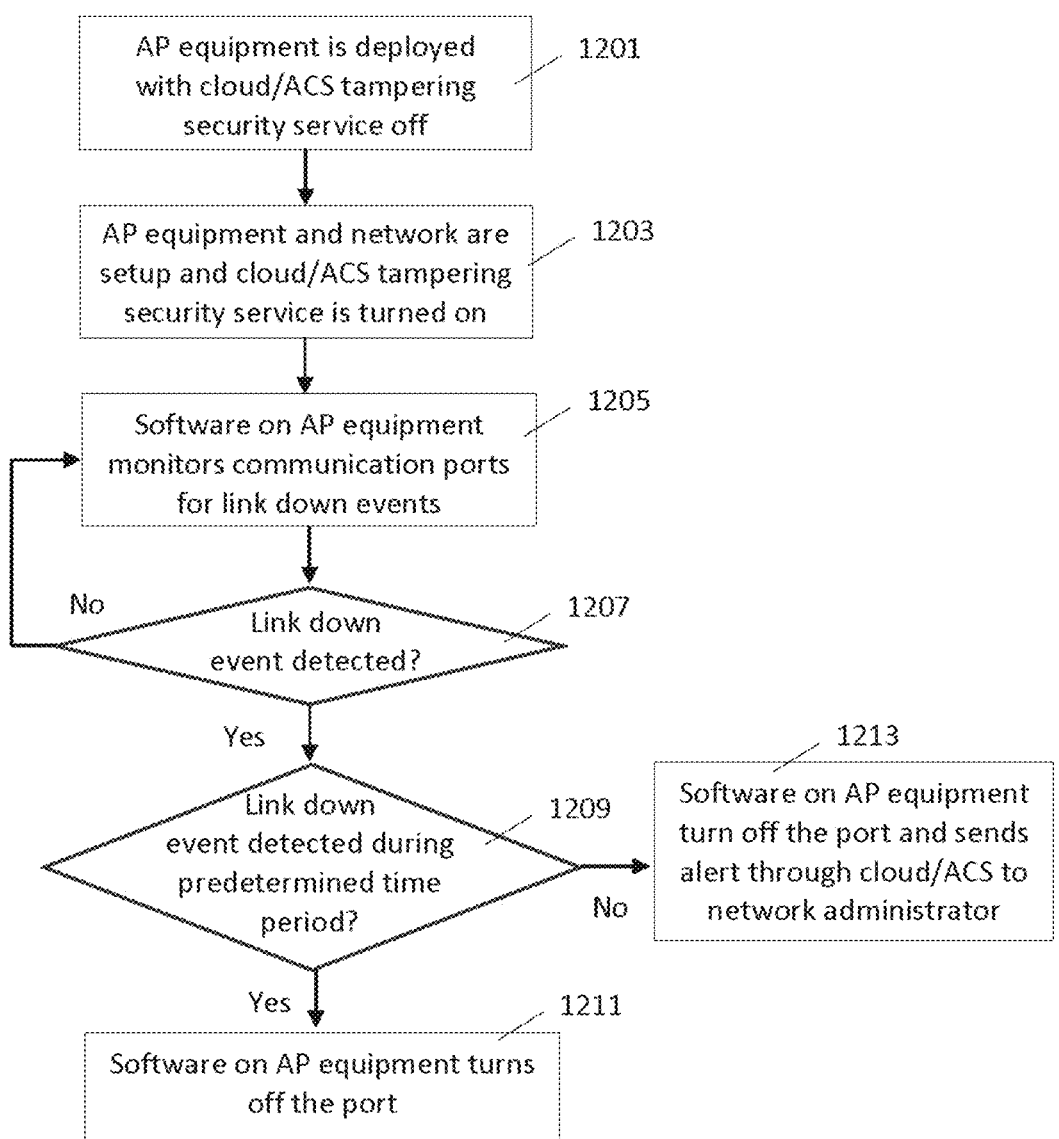
FIG. 40 is a flowchart for an embodiment of a process for providing a tampering security service with dynamic responses based on time of day.

In some embodiments, the cloud/ACS service can provide dynamic tamper response instructions to the AP devices based on time of day. The cloud/ACS service tamper response instructions to the AP devices can be proactive and/or reactive. FIG. 40 is a flowchart for an embodiment of a process for a cloud/ACS service to provide dynamic tamper detection responses to AP devices based on time of day. AP equipment is deployed in a public business environment, for example in a doctor's office waiting room. The AP equipment can be installed and set up with cloud/ACS tampering security services turned off 1201. After the AP equipment and network are installed and the set up is completed, the cloud/ACS tampering security service is turned on 1203. Software on the AP equipment monitors communication ports for link down events 1205. As described above, link down events can occur when a plug or a communications cable is removed from a port of the AP network equipment. If the software does not detect a link down event 1207, the AP equipment will continue to monitor the communication ports for link down events 1205. If the software detects the link down event 1207, the cloud/ACS will determine if the link down event occurred during a predetermined time period 1209. If the link down event is detected during the predetermined time period, the cloud/ACS software can instruct the AP equipment to turn off the port where the link down event was detected 1211. A link down notification can be sent to the local IT person who can investigate the problem, but an alert may not be sent to the cloud/ACS service. If the link down event is detected outside the predetermined time period, the cloud/ACS software can instruct the AP equipment to turn off the port where the link down event was detected and the cloud/ACS can send an alert to the network administrator who can address the problem 1213.

The described example can be useful in a business setting with the predetermined time period being the office hours of the business. If a link down event is detected during office hours, the software on the AP equipment can automatically turn off the link down port and notify the local IT person who can investigate. If a link down event is detected outside the office hours, the AP equipment automatically turns off the port and sends alert to the cloud/ACS service that can then alert the network administrator who can be located away from the business. The IT person or the network administrator can investigate the link down event and respond by correcting the problem and lowering the tamper response, maintaining the tamper response, or escalating the tamper response in the event of a serious network security breach.

In another embodiment, an AP device network can be deployed in a business office location. During the open office hours of the day when employees are present, the tamper detecting cloud/ACS service can be turned off. During the night hours outside the open office hours, the tampering response software and the tamper detecting cloud/ACS service can be turned on, so that any unauthorized link down events or access to the AP device ports is detected. When a link down event is detected, the cloud/ACS service is notified and an alert is sent to the network administrator. The network administrator can investigate the link down event and respond by correcting the problem and lowering the tamper response, maintaining the tamper response, or escalating the tamper response in the event of a serious network security breach.

In some embodiments, the AP device networks can be portable and publicly deployed at public events or gatherings. After the event or gathering ends, the AP device network components can be powered down and taken to a new location, either moved by a network administrator in an authorized move or an unauthorized move. The detected power down and movement can be a part of the security response. The AP devices can have an integrated GPS module built in, and an unauthorized change of location of the AP devices can trigger a security response upon boot up. Another way to detect a location change of the AP devices can be based on the network information on the WAN port from the IP address given to the AP device, lease time, or DNS information that can be stored. The stored information can be compared to the current GPS, the IP address, lease time, or DNS information during the bootup of the AP device to determine if the AP device has been moved. The AP equipment and/or the cloud/ACS service can implement a tamper response when an unauthorized move is detected. If the AP device network movement is authorized, the system installer can take steps such as notifying the cloud/ACS service or changing the software settings so that the tamper response is not implemented.

In some embodiments, the location, the time and the day that the AP equipment is powered on/off can be used as detected tamper triggers. The AP equipment network can have a regular operating schedule and a normal operating location that can be stored in the memory of the network server and/or the cloud/ACS service. Any deviation in the operation of the AP equipment network from this normal schedule and location can be interpreted as a tamping event. In an embodiment, the last known operating time for the AP device before powering down can be detected and recorded. When the AP device is later turned on, the new current time at booting up can also be determined and compared to the stored normal operating schedule and location. The system can also have tamper rules that can be stored in the network server and/or the cloud/ACS service. If an unexpected time or location of the AP device is detected, a tamper response action can be implemented based on the stored tamper rules. The AP device can automatically implement the tamper response and/or the cloud/ACS service can instruct the networked AP devices to implement the tamper response.

Figure 41:
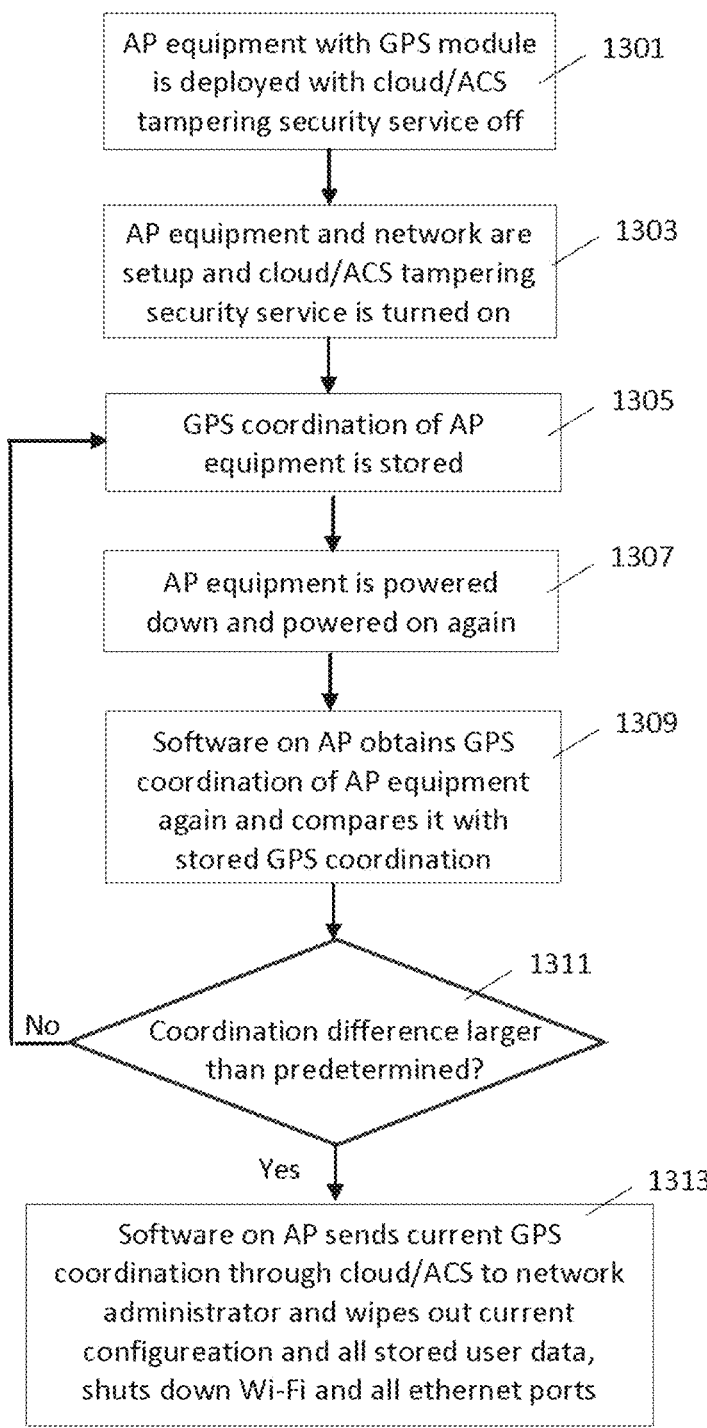
FIG. 41 is a flowchart for an embodiment of a process for providing a tampering security service with dynamic responses based on a change of location of AP network equipment.

FIG. 41 is a flowchart for an embodiment of a process for providing a tampering security service with dynamic responses based on a change of location of AP network equipment. An AP equipment with a GPS module is deployed and set up with the tampering security service turned off 1301. Once the AP equipment and network are set up, the tampering security cloud/ACS service is turned on 1303. The GPS coordinates of the AP equipment in the network are stored in a memory of the network server and/or on the cloud/ACS service 1305. The AP equipment can operate on a daily schedule that can include powered on times and powered off times during the day. The AP equipment is powered down and powered on again based on the normal operating schedule 1307. When the AP equipment is powered on, the AP devices obtain the GPS coordinates and compare it with the stored normal GPS coordinates 1309. It can be permissible within the rules for the AP equipment to be moved within a predetermined area. However, if the current GPS location is substantially different than the normal location 1311, the software on the AP can send the current GPS coordinates to cloud/ACS service as evidence of AP equipment tampering. The cloud/ACS service can transmit a notification to the network administrator. The tamper response can be issued by the cloud/ACS service based on the applied security rules. If a medium tamper response is implemented, the cloud/ACS service can instruct the AP equipment to wipe out the current network configuration and all stored user data. If a high tamper response is implemented, the cloud/ACS service can instruct the AP equipment to wipe out the current network configuration and all stored user data, and shut down Wi-Fi and all ethernet ports 1313.

An example of the process described with reference to FIG. 41 can be AP equipment proving WiFi internet that can be deployed in a large public area such as a park with the tampering security service turned off. After the AP equipment and network are set up, the tampering security service can be turned on. The normal GPS coordination of the AP equipment can be stored. If the AP equipment is stolen and someone installs it in a new location and powers it on, the current location of the AP device can be compared to the stored normal location. If there is a difference between the stored and current locations that is larger than a predetermined value, the software on the AP device can send the location information to the cloud/ACS service. The tamper rules can be applied and a tamper notification can be sent to the network administrator. Tamper response instructions can be sent to the AP devices to prevent the network tampering. In some embodiments, the tamper response can simultaneously wipe out the current network configuration and all stored user data, and shut down Wi-Fi and all ethernet ports.

In some embodiments, the undesired movement of an AP device can be detected by the failure of the AP device to communicate or find a neighboring AP device that was in the same network where the AP device is previously deployed. If an AP device cannot contact any other components in the configured network, this failure can be a tamper detection. For example, an AP device deployed in a coffee shop or on the side of a home is stolen. The stolen AP device can be moved to a new location and separated from the other components of the network. The stolen AP device can be booted up at the new location and its tampering service can be enabled during the startup. Because the stolen AP device was moved, when it is next used the stolen AP device can fail to find its residential gateway (RG) or neighboring AP devices either through LAN ports or sensing over Wi-Fi that were part of the original AP device network. The tamper software on the AP device can respond to the detected tampering by wiping the configuration on the AP device to effectively shut down the stolen AP device. Alternatively, the AP device can transmit the location or the failed network connection information to the cloud/ACS service that can instruct the AP device to wipe the configuration on the stolen AP device.

In some embodiments, an AP device can detect tampering and transmit the tampering information to the cloud/ACS service. The tamper detection can trigger notifications and tamper response instructions from the cloud/ACS service to any AP devices connected to the tampered AP device. In some embodiments, the notifications and tamper response instructions can be transmitted from the cloud/ACS service while the AP device is being tampered with. Notifications can consist of information displayed on the screen of any device connected to that AP device and the tamper response instructions can be any of the described responses.

Figure 42:
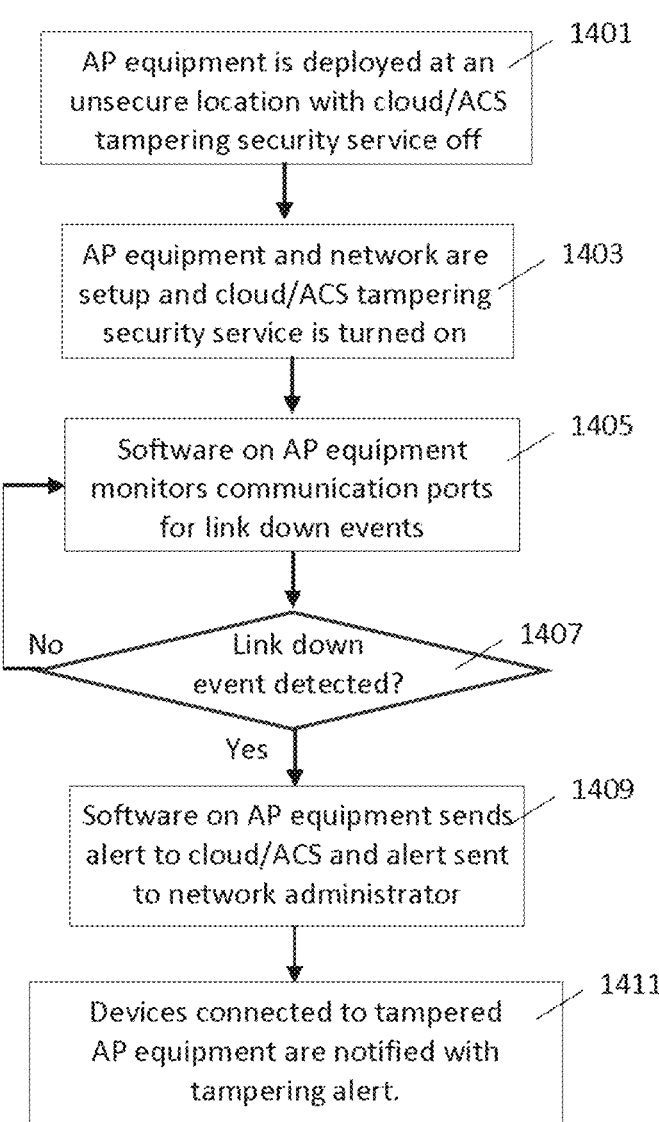
FIG. 42 is a flowchart for an embodiment of a process for providing a tampering security service with dynamic responses to tampering triggering notifications to connected users.

FIG. 42 is a flowchart for an embodiment of a process for providing a tampering security service with dynamic responses to tampering triggering notifications to connected users. AP equipment is deployed at an unsecure location with tampering detection security services turned off 1401. This can allow plugs and cables to be inserted into the ports of the AP device without triggering a tamper response. The AP equipment and network are set up and once the AP equipment is fully configured and put into active service, the tampering security service is turned on 1403. Software on the AP equipment monitors communication ports for link down events 1405. As described above, link down events occur when an authorized communications cable is removed from a port of the AP network equipment or when any locking connector plug is removed from any of the ports of the AP network equipment. If the software detects the link down event 1407, the software on the AP equipment sends a tamper alert to the cloud/ACS service. The cloud/ACS service can respond to the tamper alert by transmitting tamper response instructions to the AP device and possibly other AP devices in the network. The cloud/ACS service can also transmit a tamper alert message to the network administrator 1409.

In some embodiments, the AP device can transmit messages to devices accessing connected applications from the AP equipment notifying the connected device users of the tampering alert 1411. For example, a computing device accessing a connected application through the AP device that was tampered with will display a message to the user of that device notifying that user that AP device tampering has been detected. This notification can be constructed and delivered from the cloud/ACS service as a webpage, a popup window, and/or a portal update that can be displayed on a display of the computing device or other notification output from the computing device. This form of direct notification can invite the user to close all web browser windows and stop running applications on the computing device in communication with the tampered AP device. The cloud/ACS service can monitor the tampered AP device and provide updates on the tampering status of the AP device. In some embodiments, notifications can include emails, text messages, and automated voice calls depending on the service provider security implementation. When the tampering problem has been resolved, the cloud/ACS service can transmit a message indicating that the AP device is running again.

In some embodiments, computing devices that are identified and in communications with any of the AP devices in the network can receive similar direct notifications from the cloud/ACS service if tampering is detected in any of the network AP devices. This direct notification can be transmitted to a computing device even if the specific AP device that the computing device is connected to has not been tampered with. This group-based notification can be used to preventively inform users that a tampered AP device has been detected in their AP device network and that the security level of the AP devices in the network has been changed accordingly. The notification can suggest that users pause, limit, or stop their connected computing devices' web access and connected applications.

Figure 43:
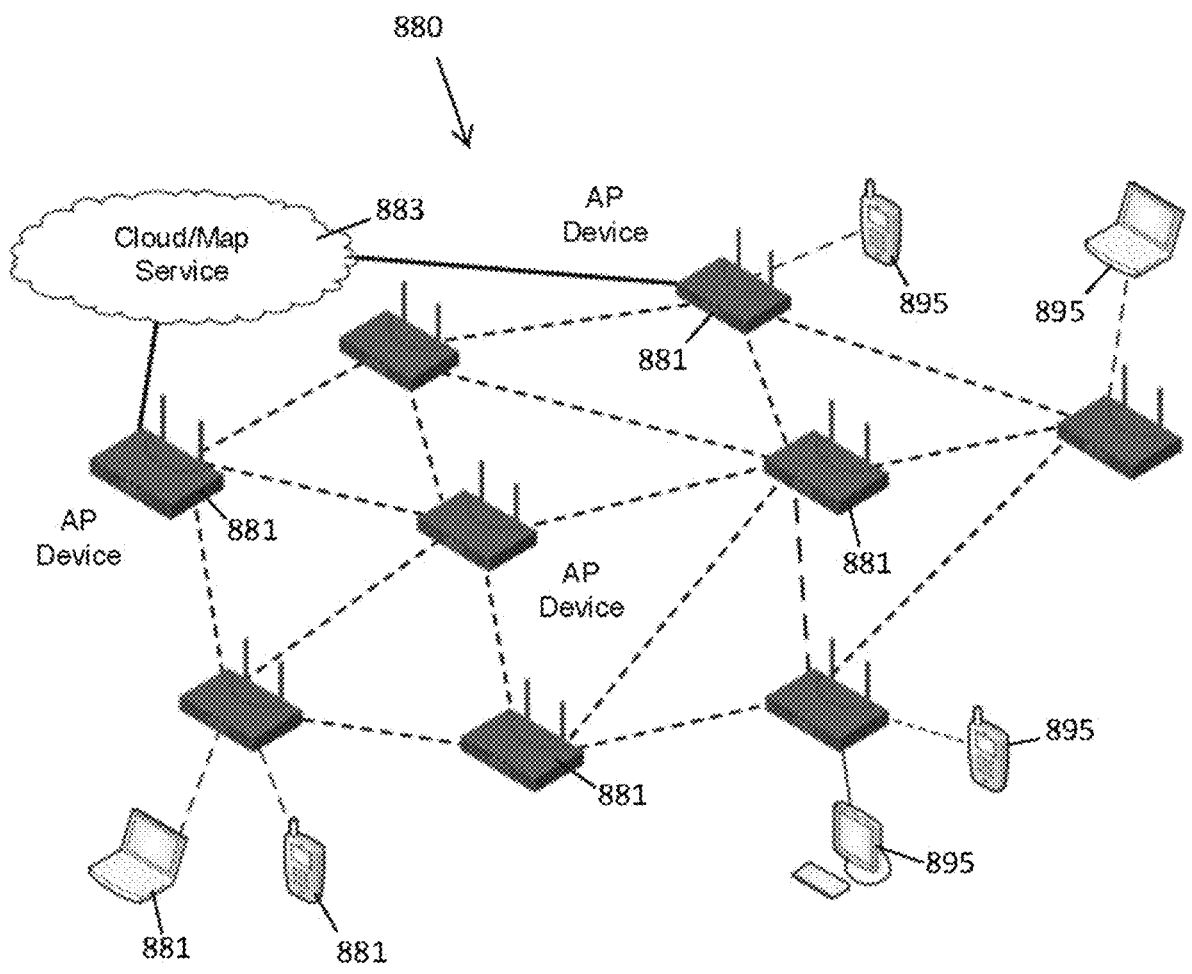
FIG. 43 illustrates an embodiment of an AP device network with Cloud/ACS services.

FIG. 43 illustrates an AP device network 880 having a plurality of AP devices 881 and a cloud/ACS service 883. Various computing devices including phones 891, laptops 893, computers 895, and other devices can access the internet through wired or wireless communications with the AP devices 881. The AP devices 881 can detect and transmit tamper detection information and AP device status information to the cloud/ACS service 883. The cloud/ACS service 883 can receive the tamper detection information and determine an appropriate tamper response for the AP devices 881. The cloud/ACS service 883 can transmit tamper response instructions to one or more of the AP devices 881 in the AP device network 880. The AP devices 881 can be configured to automatically perform tamper responses and/or perform the cloud/ACS service instructed tamper responses to stop the detected tampering. The possible tamper response actions can include shutting off the port that the tampering was detected at, shutting down the AP device 881 that the tampering was detected, disabling or damaging the AP device 881 that the tampering was detected, shutting down the AP devices 881 in the vicinity of the AP device 881 that the tampering was detected, and shut down the entire AP device network 880.

Figure 44:
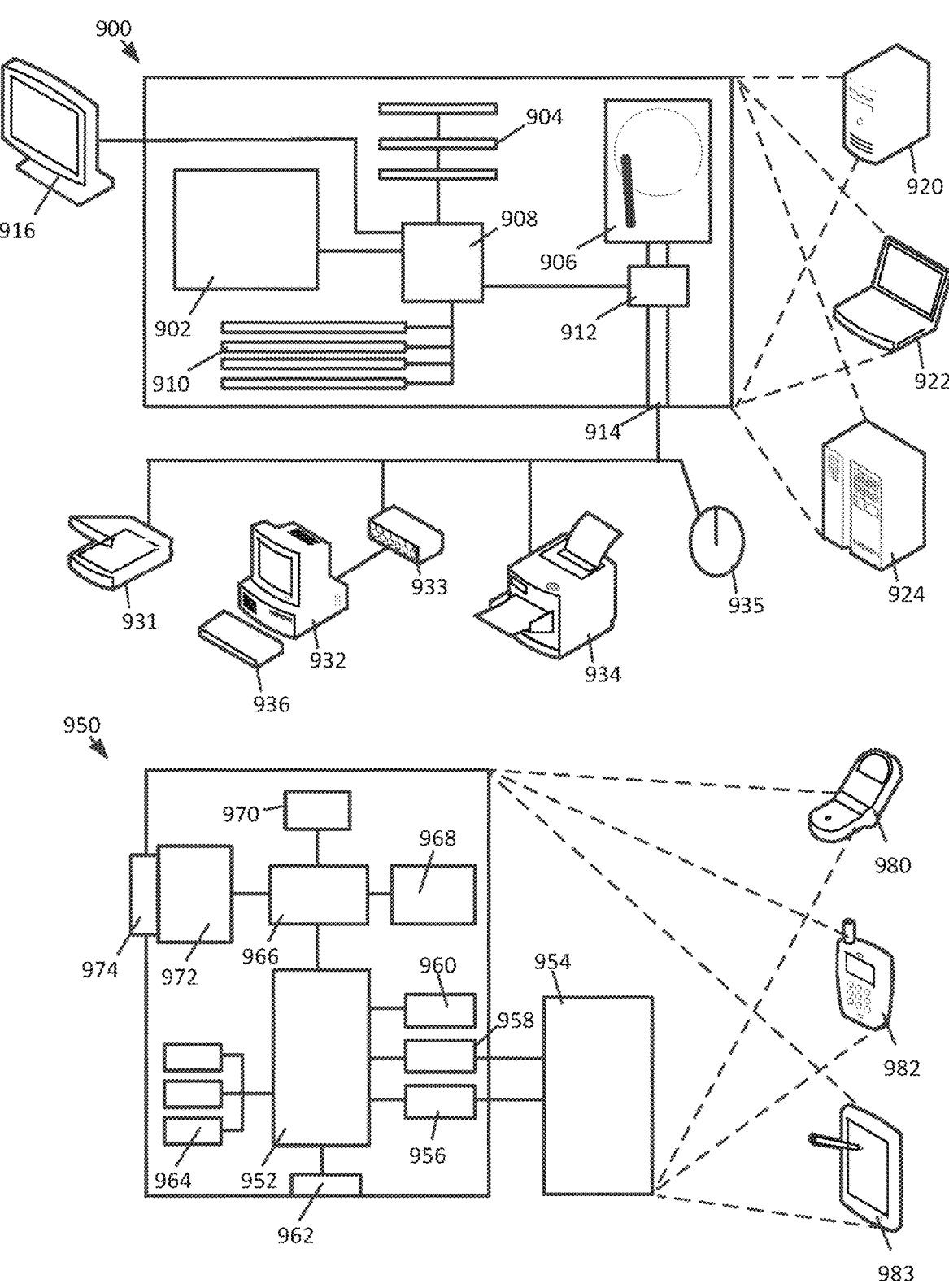
FIG. 44 illustrates a generic computer device and a generic mobile computer device that can communicate with the AP device network.

FIG. 44 shows an example of a generic computer device 900 and a generic mobile computer device 950, which may be used to implement the processes described herein, including the mobile-side and server-side processes for installing a computer program from a mobile device to a computer. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC. WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The present disclosure, in various embodiments, includes components, methods, processes, systems, and/or apparatus substantially as depicted and described herein, including various embodiments, subcombinations, and subsets thereof. Those of skill in the art will understand how to make and use the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease, and/or reducing cost of implementation. Rather, as the following claims reflect, inventive aspects lie in less than all features of any single foregoing disclosed embodiment.

What is claimed is:

1. A network security system comprising:
a network access point (AP) equipment having an AP processor, a plurality of registered jack (RJ) communication connector ports, and electrical contacts in each of the plurality of RJ communication connector ports;
a first RJ connector plug in a first port of the plurality of RJ communication connector ports, the first RJ connector plug having a plurality of conductive connectors in contact with the electrical contacts in the first port wherein a first pair of the plurality of conductive connectors in the first RJ connector plug are electrically coupled to each other to form a closed circuit; and
a communications cable connector plug in a second port of the plurality of RJ communication connector ports, the communications cable connector plug having a plurality of conductive connectors for transmitting signals to and from the network access point equipment;
a server computer in communication with the network access point equipment, the server computer having a server memory;
wherein the AP processor is configured to detect a tamper condition at the first port corresponding to a change in an electrical condition associated with the closed circuit formed by the electrically coupled first pair of conductive connectors when the first RJ connector plug is removed from the first port, and to detect a link down event at the second port when the communications cable connector plug is removed from the second port, and to transmit tamper detection data corresponding to the detected tamper condition or the detected link down event to the server computer.

2. The network security system of claim 1, further comprising:
a locking cover secured around the first RJ connector plug to prevent removal of the first RJ connector plug from the network access point equipment.

3. The network security system of claim 1, wherein a second pair of the plurality of conductive connectors are electrically coupled in the first RJ connector plug and the server memory stores the normal electrical signals that includes the second pair of the plurality of conductive connectors that are electrically coupled to each other and not electrically coupled to the first pair of the plurality of conductive connectors, and the server processor compares an electrical signal from the electrical contacts in the second pair of the plurality of conductive connectors to the normal electrical signals stored in the server memory to identify the link down event.

4. The network security system of claim 3, wherein a third pair of the plurality of conductive connectors are electrically coupled in the first RJ connector plug and the server memory stores the normal electrical signals that includes the third pair of the plurality of conductive connectors that are electrically coupled to each other and not electrically coupled to the first pair or the second pair of the plurality of conductive connectors, and the server processor compares an electrical signal from the electrical contacts in the third pair of the plurality of conductive connectors to the normal electrical signals stored in the server memory to identify the link down event.

5. The network security system of claim 1, further comprising:
a communications cable connector plug in a second of the plurality of RJ communication connector ports, the communications cable connector plug having a second plurality of conductive connectors in contact with the electrical contacts in the second of the plurality of RJ communication connector ports;
wherein the AP processor is coupled to the electrical contacts in the plurality of RJ communication connector ports and the server processor is configured to receive a link down event signal from the AP processor when the communications cable connector plug is removed from the second of the plurality of RJ communication connector ports.

6. The network security system of claim 5, wherein the server memory stores normal electrical signals from the communications cable connector plug and the server processor compares a current electrical signal from the communications cable connector plug to the normal electrical signals to identify the link down event.

7. The network security system of claim 1, wherein the network access point equipment has a transmitter for transmitting link down event information about the link down event to the server.

8. The network security system of claim 7, wherein tamper detection software running on the server processor transmits instructions to the AP processor to disable the first port when the link down event is detected by the tamper detection software running on the network access point equipment.

9. The network security system of claim 7, further comprising:
a fuse electrically coupled to a power supply of the AP equipment;
wherein the tamper software running on the server processor instructs the AP processor to increase electrical power applied to destroy the fuse when the link down event is detected by the tamper detection software running on the network access point equipment.

10. The network security system of claim 7, further comprising:
a thin trace electrically coupled to a power supply of the AP equipment;
wherein the tamper software running on the server processor instructs the AP processor to increase electrical power applied to destroy the thin trace when the link down event is detected by the tamper detection software running on the network access point equipment.

11. A network security system comprising:
a network access point (AP) equipment having an AP processor, a plurality of registered jack (RJ) communication connector ports, electrical contacts in the plurality of RJ communication connector ports, and tamper detection software running on the AP processor;

a first RJ connector plug in a first port of the plurality of RJ communication connector ports of the network access point equipment, the first RJ connector plug having a plurality of conductive connectors in contact with the electrical contacts in the first port and a first pair of the plurality of conductive connectors in the first RJ connector plug permanently electrically coupled to each other to form a closed circuit;

a communications cable connector plug in a second port of the plurality of RJ communication connector ports, the communications cable connector plug having a plurality of conductive connectors for transmitting signals to and from the network access point equipment; and a server computer in communication with the network access point equipment, the server computer having a server memory;

wherein the tamper detection software running on the AP processor is configured to detect a tamper condition at the first port corresponding to a change in an electrical condition associated with the closed circuit formed by the electrically coupled first pair of conductive connectors when the first RJ connector plug is removed from the first port, and to detect a link down event at the second port when the communications cable connector plug is removed from the second port, and the tamper detection software is configured to transmit tamper detection data corresponding to the detected tamper condition or the detected link down event to the server computer.

12. The network security system of claim 11, further comprising:

a locking cover secured around the communications cable connector plug to prevent removal of the communications cable connector plug from the second port in the network access point equipment.

13. The network security system of claim 11, wherein a second pair of the plurality of conductive connectors are electrically coupled in the first RJ connector plug and the server memory stores the normal electrical signals that include the second pair of the plurality of conductive connectors that are electrically coupled and the server processor compares electrical signals from the electrical contacts in the second pair of the plurality of conductive connectors to the normal electrical signals stored in the server memory to identify the link down event.

14. The network security system of claim 11, wherein the server computer has a transmitter for transmitting link down event information about the link down event detected by the tamper software from the network access point equipment to an administrator computing device.

15. The network security system of claim 11, wherein the tamper detection software running on the AP processor of the network access point equipment disables the first port in response to instructions from the server computer when the link down event is detected by the tamper detection software running on the network access point equipment.

16. The network security system of claim 11, wherein the network access point equipment has a fuse electrically coupled to the power supply and the tamper detection software running on the AP processor of the network access point equipment increases electrical power applied to the fuse to destroy the fuse in response to instructions from the server computer when the link down event is detected by the tamper detection software running on the network access point equipment.

17. The network security system of claim 11, wherein the network access point equipment has a thin trace electrically coupled to the power supply and the tamper detection software running on the AP processor increases electrical power applied to the thin trace to destroy the thin trace in response to instructions from the server computer when the link down event is detected by the tamper detection software running on the network access point equipment.

* * * * *